US006721714B1

(12) United States Patent
Baiada et al.

(10) Patent No.: US 6,721,714 B1
(45) Date of Patent: Apr. 13, 2004

(54) METHOD AND SYSTEM FOR TACTICAL AIRLINE MANAGEMENT

(76) Inventors: R. Michael Baiada, 30943 Buttermilk Ct., Evergreen, CO (US) 80439; Lonnie H. Bowlin, 700 Woodland Way, Owings, MD (US) 20736

( * ) Notice: Subject to any disclaimer, the term of this patent is extended or adjusted under 35 U.S.C. 154(b) by 0 days.

(21) Appl. No.: 09/549,074

(22) Filed: Apr. 16, 2000

Related U.S. Application Data

(60) Provisional application No. 60/129,563, filed on Apr. 16, 1999, provisional application No. 60/173,049, filed on Dec. 24, 1999, and provisional application No. 60/189,223, filed on Mar. 14, 2000.

(51) Int. Cl.$^7$ ............................................. G06F 17/60

(52) U.S. Cl. .................................... 705/7; 705/5; 705/6

(58) Field of Search ............................ 705/7, 9, 5, 6

(56) References Cited

U.S. PATENT DOCUMENTS

| | | | |
|---|---|---|---|
| 5,321,605 A | 6/1994 | Chapman et al. | 364/402 |
| 5,369,570 A | 11/1994 | Parad | 364/401 |
| 5,890,133 A | 3/1999 | Ernst | 705/7 |
| 5,953,707 A | 9/1999 | Huang et al. | 705/10 |
| 6,253,064 B1 * | 6/2001 | Monroe | 455/66 |
| 6,263,315 B1 * | 7/2001 | Talluri | 705/8 |
| 6,366,655 B1 * | 4/2002 | Book et al. | 379/114.28 |
| 6,415,219 B1 * | 7/2002 | Bouve et al. | 707/10 |

FOREIGN PATENT DOCUMENTS

EP   Wo 8907798   *   8/1989

OTHER PUBLICATIONS

McGee William J. " Getting There Faster and Cheaper". Air Transport World. vol. 32, Iss. 9. pp. 46–49. Sep. 1995. Downloaded from Dialog.*

Henderson, Danna. "Command Center on the Prairie". Air Transport World. vol. 28. Iss. 5. pp. 38–40. May 1991. Downloaded from Dialog.*
"Aviation and Risk Management". Risk Management. p. 10. Jul. 1992. Downloaded from Dialog.*
"Rapid Response". Information Week. p. 40. Jan. 11, 1999. Downloaded from Dialog.*
Unknown, Center–Tracon Automation System, Sep. 5, 1991.
Baiada, DNAV: What's So Different About It, Professional Pilot, Apr. 1984, pp. 74–88.
Carr et al., Airline Arrival Prioritization In Sequencing and Scheduling, Dec. 1998, 8p.
Quinn & Zelenka, ATC/Air Carrier Collaborative Arrival Planning, Dec. 1998, 11p.
Baiada, Tactical Aircraft Management, Internal Memo to United Airlines, May. 9, 1996, 17p.

(List continued on next page.)

*Primary Examiner*—Romain Jeanty
(74) *Attorney, Agent, or Firm*—Larry J. Guffey

(57) ABSTRACT

The present invention provides a method and system for managing the assets of a user airline. In a preferred embodiment, this method comprises the steps of: (a) collecting and storing specified data, (b) processing this data to predict the trajectories of the user airline assets and the loads that these trajectories will place upon the assets of the user airline, (c) processing this data, predicted trajectories and loads to determine the capability of the user airline and the common assets to meet these loads and needs while achieving user airline specified, business goals, (d) processing this data to create alternative, potential scenarios, wherein these scenarios include calculations for the changes in the loads caused by the changed trajectories, (e) processing and evaluating these alternative, potential scenarios to identify those scenarios which satisfy the asset loads, needs and specified business goals to a predetermined level, and (f) communicating these identified scenarios to user airline assets so that the trajectory changes may be implemented.

16 Claims, 21 Drawing Sheets

– Sample Method of the Present Invention

OTHER PUBLICATIONS

Baiada, RMB Assoc., Free Flight: Reinventing Air Traffic Control, Mar. 15, 1995, 9p.

Baiada, Thoughts Posted on Compuserve, 10/95–2/97, 9p.

Baiada & Bowlin, U.S. Provisional patent application No. 60/129,563, filed Apr. 16, 1999, and entitled "Tactical Aircraft Management,".

Baiada & Bowlin, U.S. Provisional patent application No. 60/173,049, filed Dec. 24, 1999, entitled "Tactical Airline Management,".

Baiada & Bowlin, U.S. Provisional patent application No. 60/189,223, filed Mar. 14, 2000, entitled "Tactical Airline Management,".

* cited by examiner

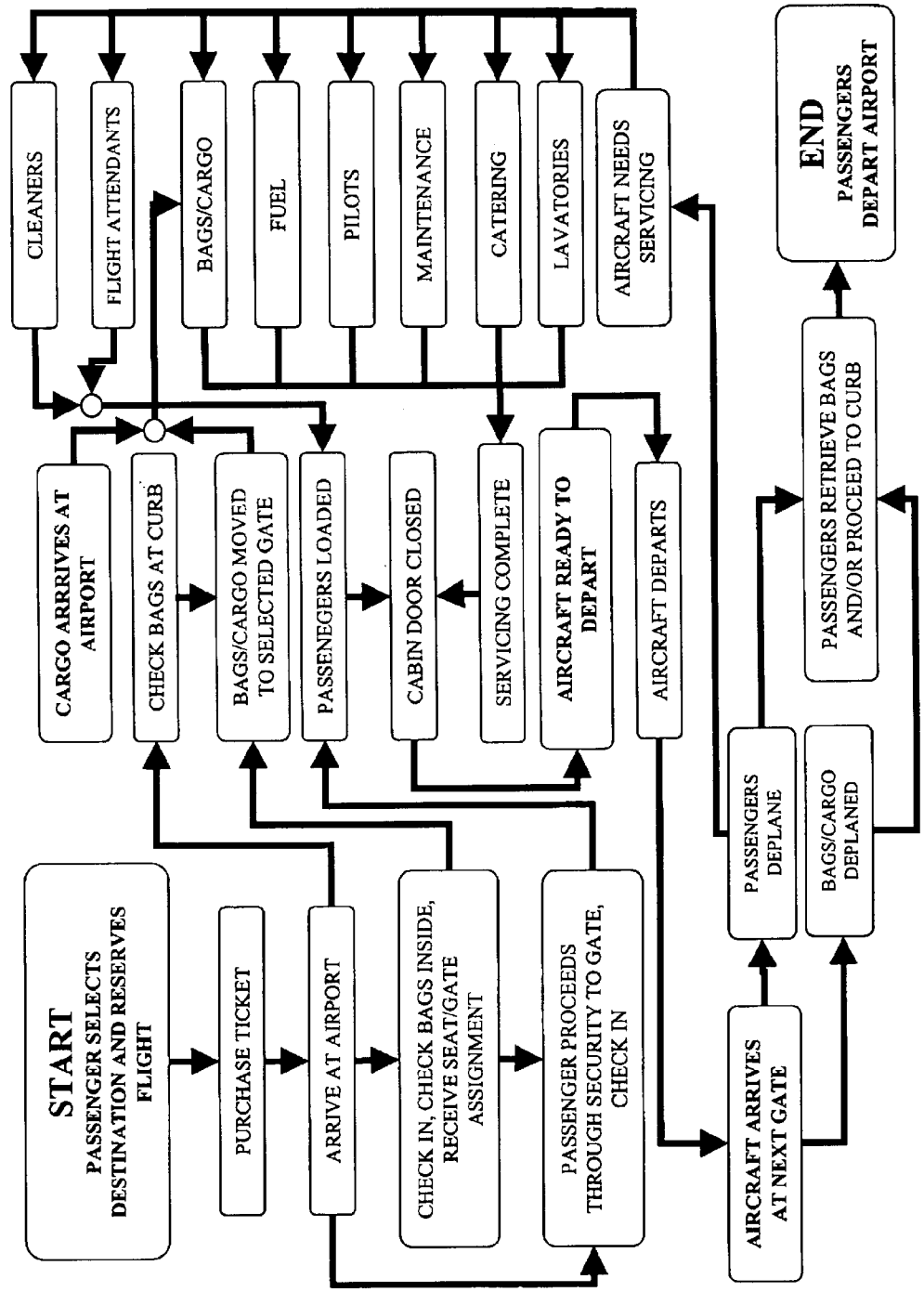
FIG. 1 – Typical Airline Production Process (PRIOR ART)

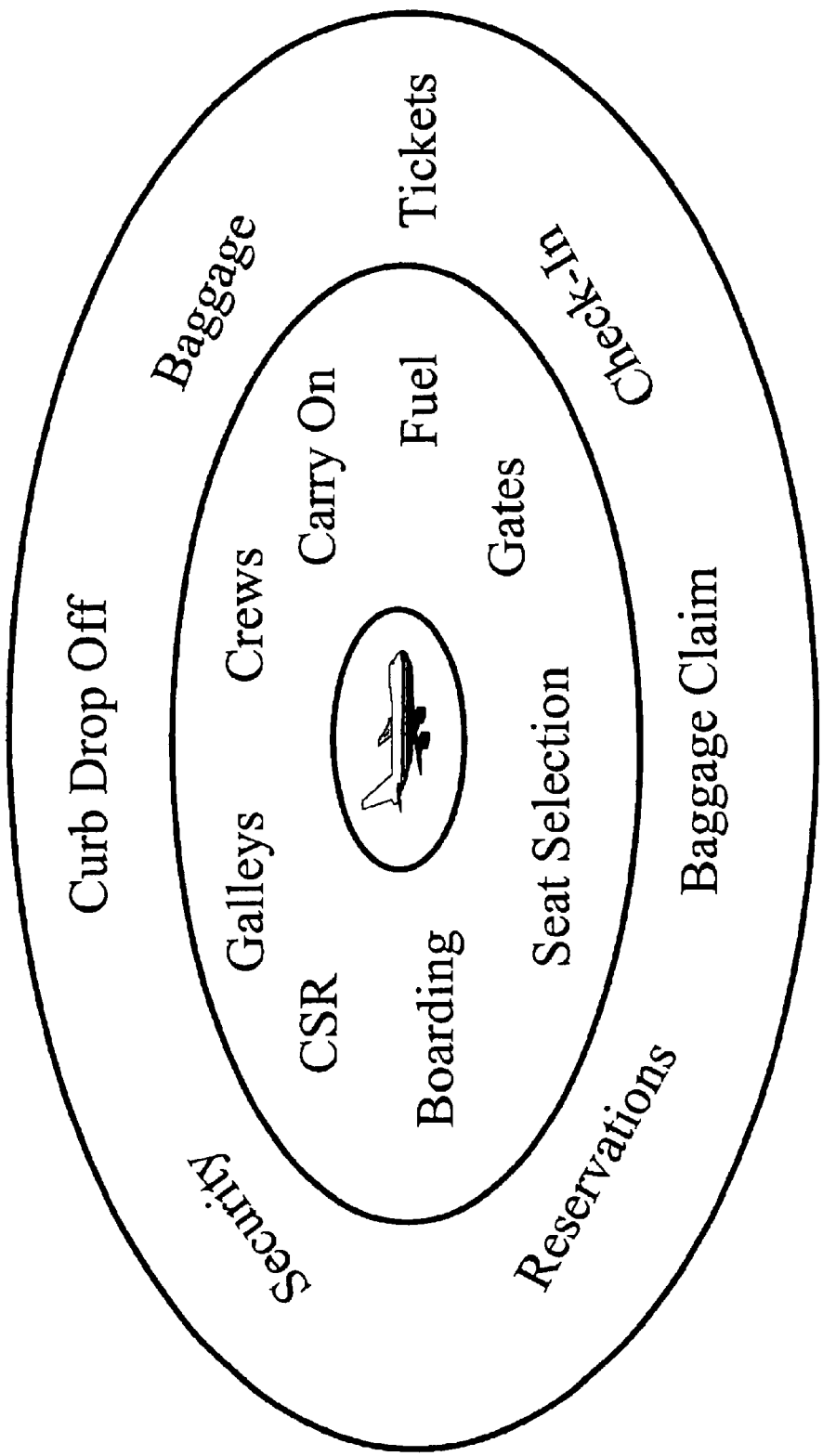
FIG. 2 – Airline Tasks Centered on Aircraft Movement (PRIOR ART)

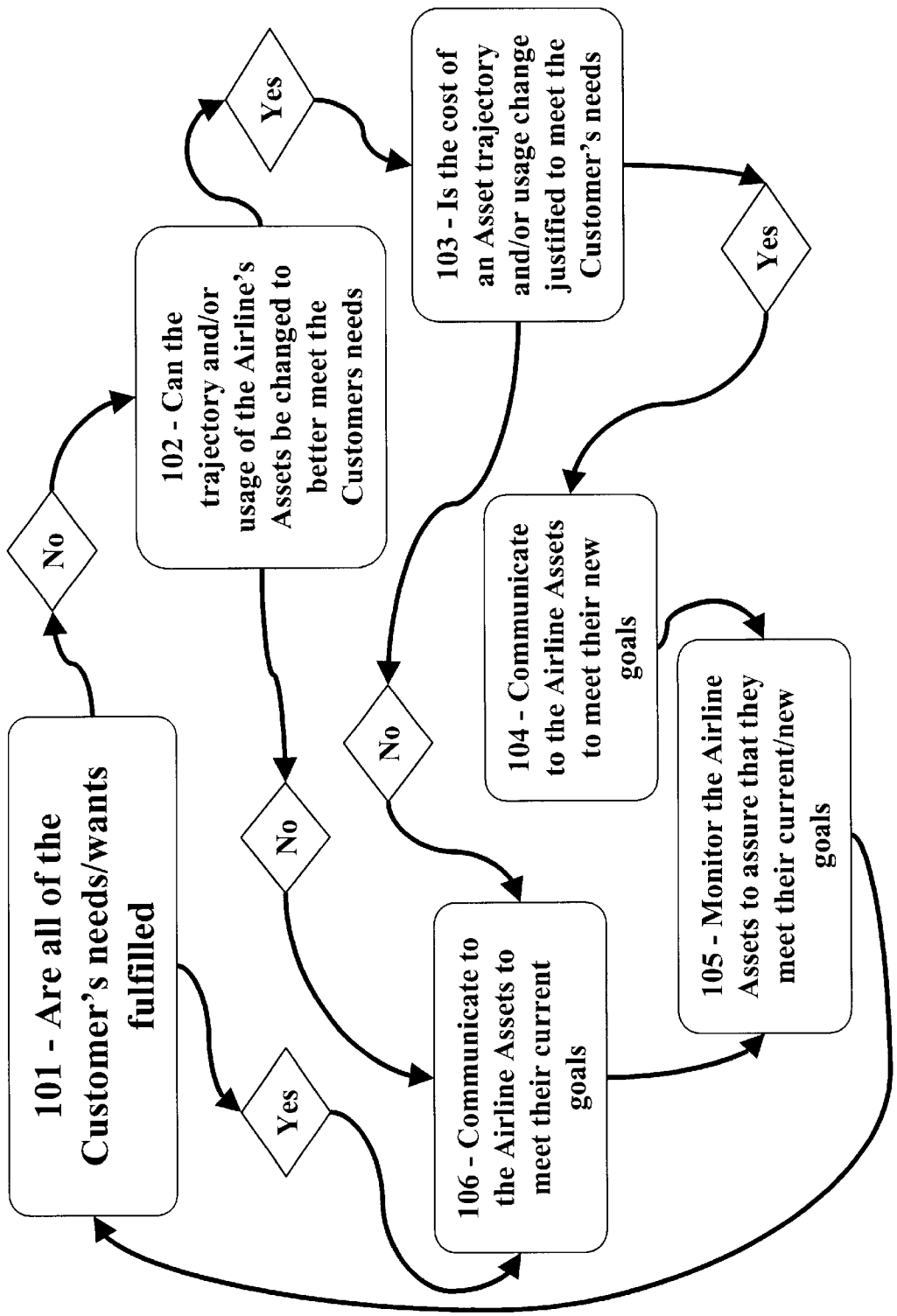
FIG. 3 – Sample Method of the Present Invention

FIG. 4a – Decision Process Necessary to Meet the Customer's Needs/Wants

Key Question: Are the Customer/Passenger's Needs/Wants Fulfilled?

Additional Important Questions:

1. What is optimum gate arrival time in a perfect world for a single aircraft?

2. Are airline services (gate, cleaning, fuel, etc.) available to meet aircraft needs taking into account available assets and other aircraft needs?

3. Is airspace infrastructure (runways, airspace, arrival fix) capable of meeting aircraft needs taking into account available assets and other aircraft needs?

4. What timeframe are flights monitored into the future? [Note: typically 24 hours with multiple flight segments]

5. What time are the control actions taken?

FIG. 4b – Decision Process Necessary to Meet the Customer's Needs/Wants

Decision 1 – Customer/Passenger Needs/Wants

Focus: Individual Customer/Passenger Wants/Needs

Question: What does the customer expect?

Tasks/Needs/Events/Activities:
1 Arrive at the destination curb, on time, smiling & bag in hand
Easy process to plan the trip
Easy process to buy a ticket
Easy airport check-in and bag check
No lines
Easy gate check-in
Easy boarding
Depart on time
Smooth flight
Good service (i.e., food, drinks)
Comfortable seat
Arrive on time
Short Walk
No waiting for bags

FIG. 4c – Decision Process Necessary to Meet the Customer's Needs/Wants

Decision 2 – Strategic Airline Decisions

Focus: Airline Processes

Question: Can the airline meet the passengers needs/wants?

Tasks/Needs/Events/Activities:
Sub-Process #1 Planning to Boarding Area
- Trip planning process
- Ticket sales process
- Airport check-in process
- Bag check process
- Security process
- Passenger transportation process if required
- Gate check-in process Sub-Process #2 - Gate to Gate
- Boarding process
- Aircraft service & movement processes
- De-planning process Sub-Process #3 - Boarding Area to Destination Curb
- Passenger transportation process if required
- Bag claim process
- Quality Control, problem resolution

FIG 5a - Decision/Command Matrix Used to Calculate Aircraft Gate Arrival Times

Critical Factors:

1. What is the optimum airport arrival time for each aircraft as determined by the airline/user/pilot?
2. What can the individual airlines do to meet the needs of all of the aircraft approaching the airport?
3. Is the airspace infrastructure (runways, airspace, arrival fix) capable of meeting the aircraft needs taking into account available assets and the needs of all of the other aircraft?
4. What time are the control actions taken? [Note: the future trajectory prediction of all of the assets is an important aspect of this decision]

FIG. 5b - Decision/Command Matrix Used to Calculate Aircraft Gate Arrival Times

Decision 1 - Intra-Aircraft Decisions

Focus: Aircraft and User Needs and Wants

What does the individual aircraft need and/or want?
Arrival at airport at OAG Scheduled Arrival Time
Evaluate future trajectories for needs (Look Ahead)
Enough airport Time to:
- Get Passengers off/on
- Get Baggage off/on
- Get Cargo off/on
- Complete Aircraft Servicing (lavs, food, etc.)
- Complete required maintenance items
- Depart on time for next segment
Enough connection time for passengers Maintenance Actions
- Scheduled maintenance
- Unscheduled repairs
  - Deicing
  - Known repairs
Shorter route
Comfortable ride
Use Minimum Fuel
A gate upon arrival
Crew (Pilots and Flight Attendants)

Key Questions
What services does aircraft need? Regular or special?
What time does aircraft want to arrive in a perfect world?

Aircraft Characteristics
Safe Speed Range
Fuel Burn Model (fuel available to make desired change)
Wind Model
Altitude Capability (aircraft weight)

Enroute Weather Model
Enroute Turbulence Model
Aircraft position data
Fuel Burn Model (minimum fuel usage)

FIG. 5c – Decision/Command Matrix Used to Calculate Aircraft Gate Arrival Times

Decision 2 - Intra-Airline Decisions

Focus: Airline Capabilities to meet needs of all aircraft

Can the airline meet the aircraft's needs?

- Gate Availability
- Jetway or Stair Availability
- Baggage Crew Availability
- Fueling Availability
- Flow of Passenger Connecting Flights
- Mechanic Availability

- Dynamic Gate Management
- Asset Trajectory Matching
- Cleaning Crew Availability
- Agent Availability
- Galley Loading/Unloading
- Parts Availability

Key Questions

What is the airline's ability to meet the needs of all aircraft?
Will airline service capability delay aircraft?

Airline Data

- Airport data
- Fuel truck data
- Passenger data/model
- Mechanic data

- Crew data
- Customer Service Agent data
- Galley data
- Aircraft parts data

FIG. 5d - Decision/Command Matrix Used to Calculate Aircraft Gate Arrival Times

Decision 3 - Aviation Authority Decisions/Data

Focus: Infrastructure Capabilities to meet needs of all aircraft

Can the infrastructure meet the aircraft's needs?
- Airspace Availability
- Arrival Fix Availability
- Weather
- Runway Availability
- Infrastructure Trajectory Matching Demand

Key Questions
- What is the aviation authority's ability to meet needs of all aircraft?
- Will infrastructure constraints delay aircraft?

Infrastructure Data
- Runway Acceptance Rate
- Weather
- Cornerpost Acceptance Rate
- Equipment Status

FIG. 5e – Decision/Command Matrix Used to Calculate Aircraft Gate Arrival Times

Control Action 1 - Airline/Aviation Authority

Focus – How and When to Make Control Action Happen

Control Actions

Transmit fix crossing time to aircraft

Monitor actions to assure aircraft response meets the new assigned goals

Key Questions

What time should control action take place?

How should pilot be notified?

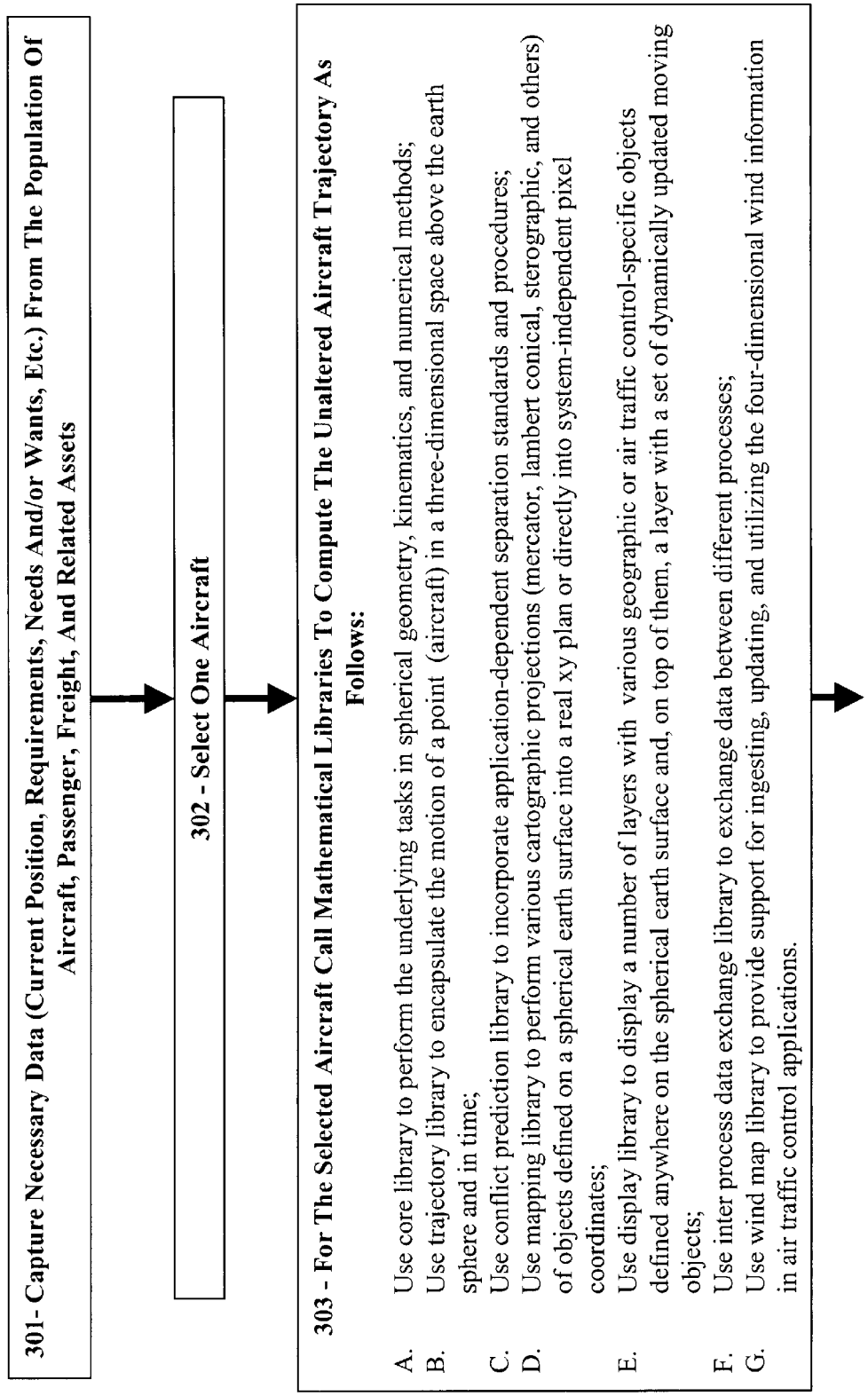
FIG. 6a – Sample Computational Steps of the Present Invention

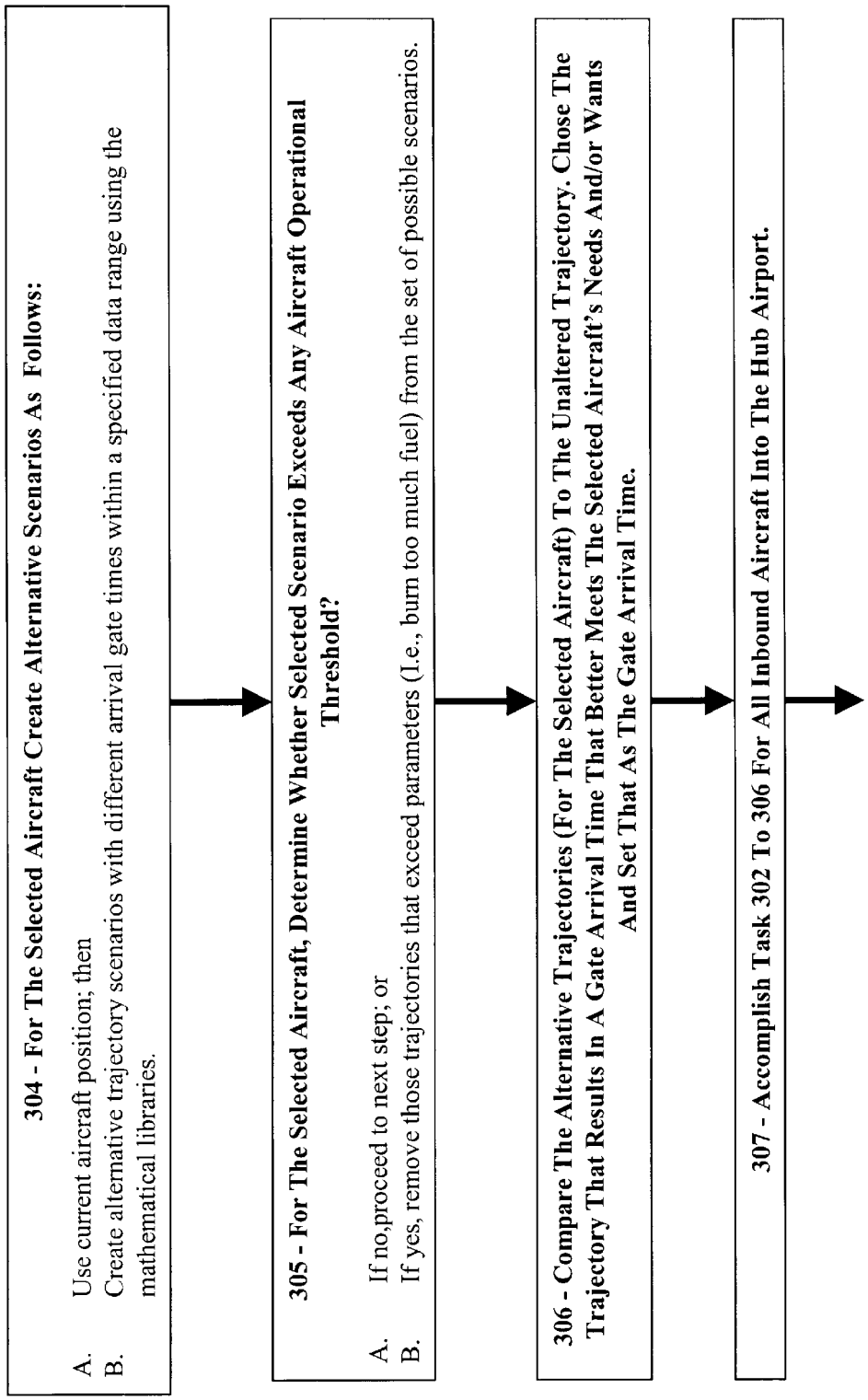
FIG. 6b - Sample Computational Steps of the Present Invention

FIG. 6c – Sample Computational Steps of the Present Invention

308 - Call Data Libraries And Usage Trajectories Of The Airline Hub Assets To Determine If The Airline Hub Assets Can Meet The Individual Needs And/or Wants (I.E., Gate Arrival Time) Of Each Inbound Aircraft:

A. If no, modify the gate arrival time of the controlled aircraft (as done in steps 304 through 306) until the airline assets can meet the real time needs an/or wants of the aircraft and set that as the new gate arrival time; or
B. If yes, use the computed gate arrival time from the previous step for each controlled aircraft.

→

309 - For The Selected Aircraft Gate Arrival Time Based On The Aircraft Needs And/or Wants Modified To The Airline's Ability To Meet The Aircraft's Needs, Compute All Hub Inbound Aircraft Trajectories (Controlled And Uncontrolled), Call Airspace Data And Capacity Libraries And Determine If The Air Traffic Control System, Airspace Capacity And Runway Capacity Can Meet The Needs And/or Wants (I.E., Inbound Aircraft Flow Rate) Of Each Inbound Aircraft:

A. If no, modify the gate arrival time of the controlled aircraft until the airspace/runway capacities can meet the real time needs an/or wants of the airline and set that as the new gate arrival time for each controlled aircraft; or
B. If yes, use the computed gate arrival time from the previous step for each controlled aircraft.

→

310 - For All Of The Controlled Aircraft Compute The Cornerpost Arrival Time Based On The Final Computed Gate Arrival Time From The Previous Step.

→

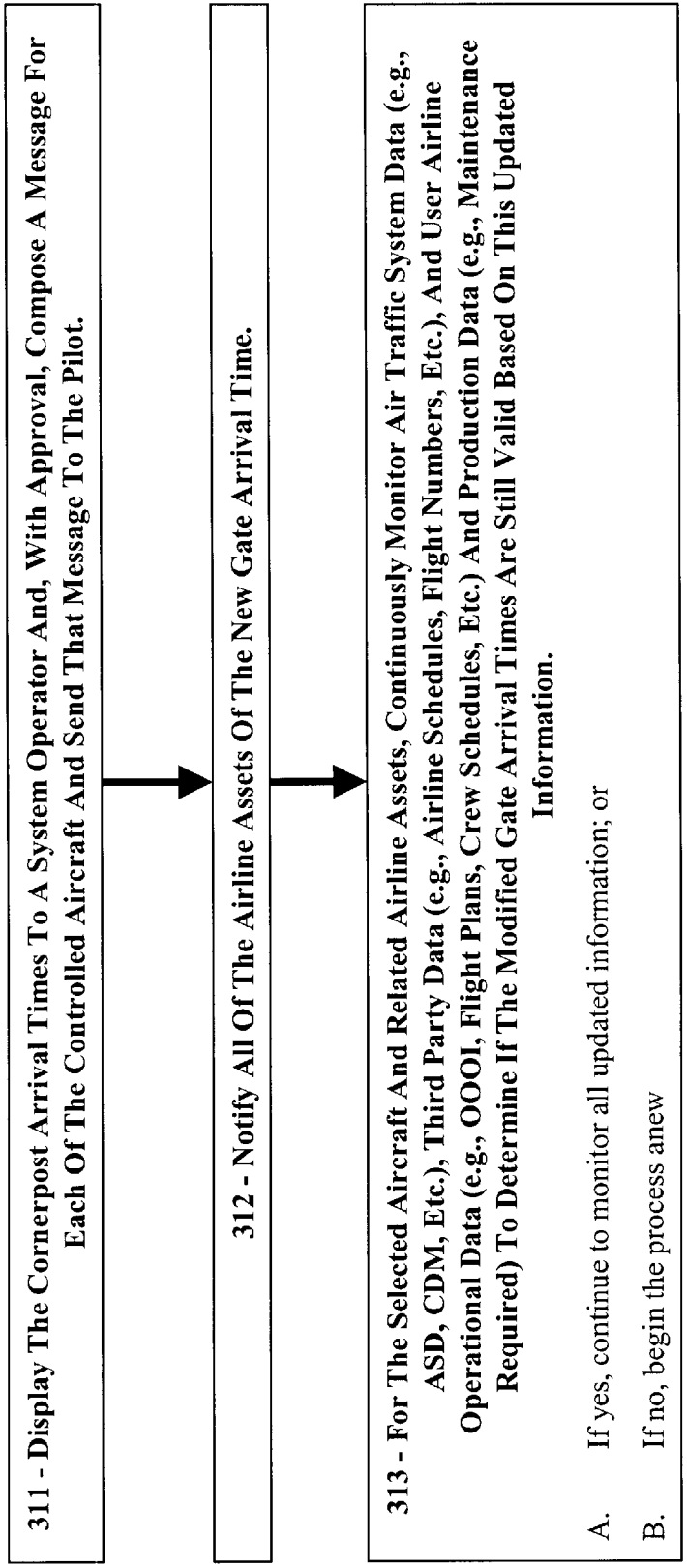
FIG. 6d - Sample Computational Steps of the Present Invention

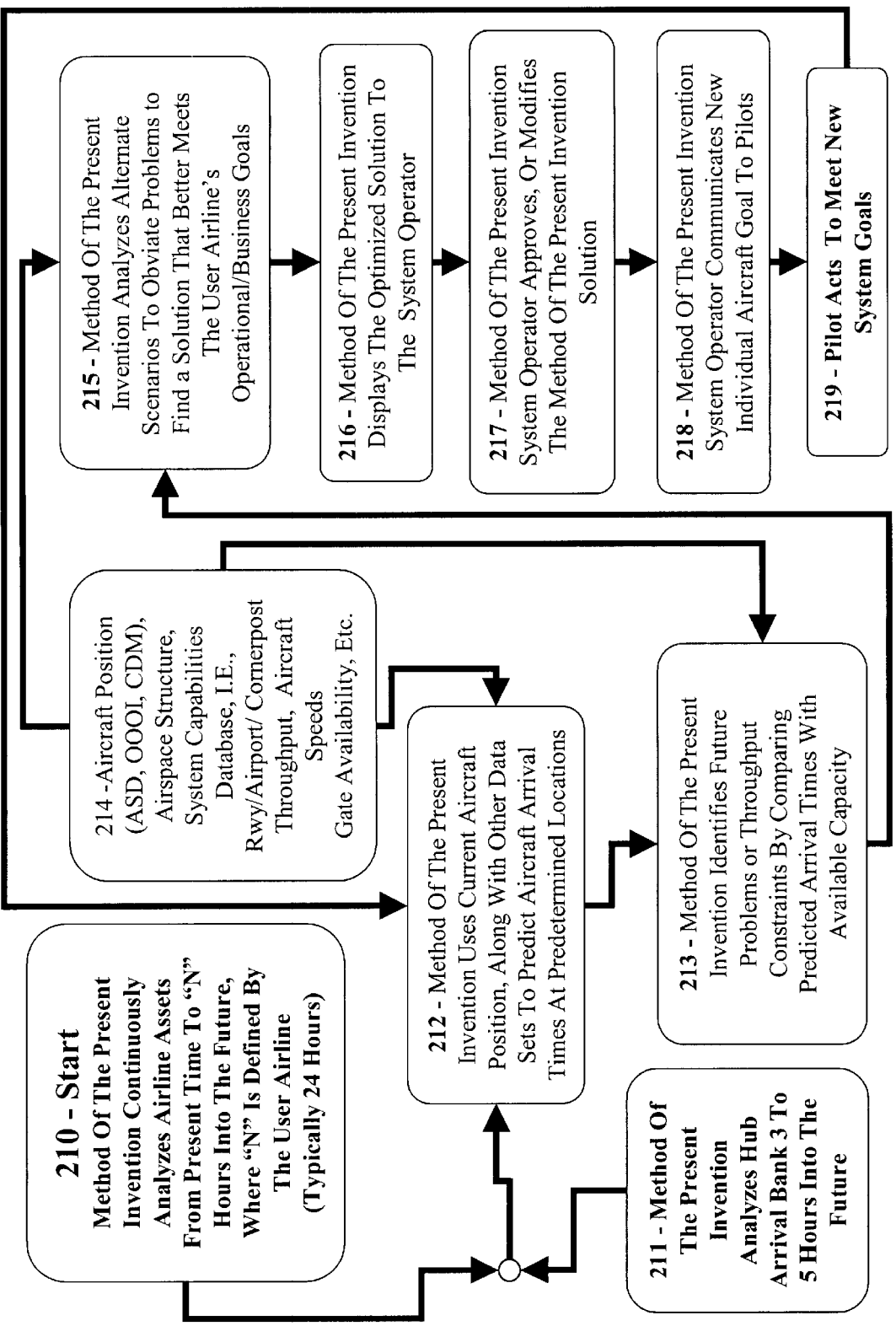
FIG. 7 - Sample Method of the Present Invention

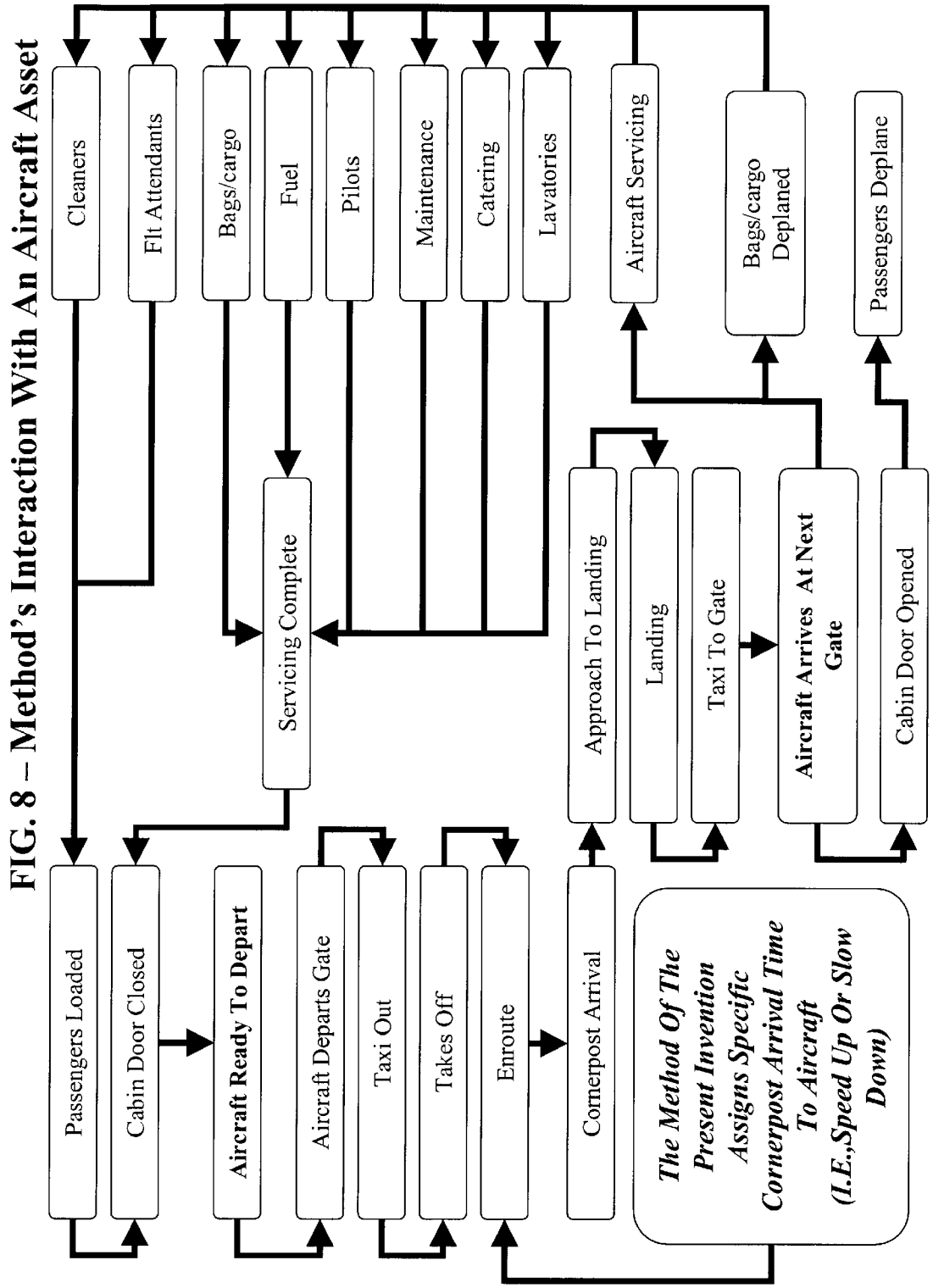
FIG. 8 – Method's Interaction With An Aircraft Asset

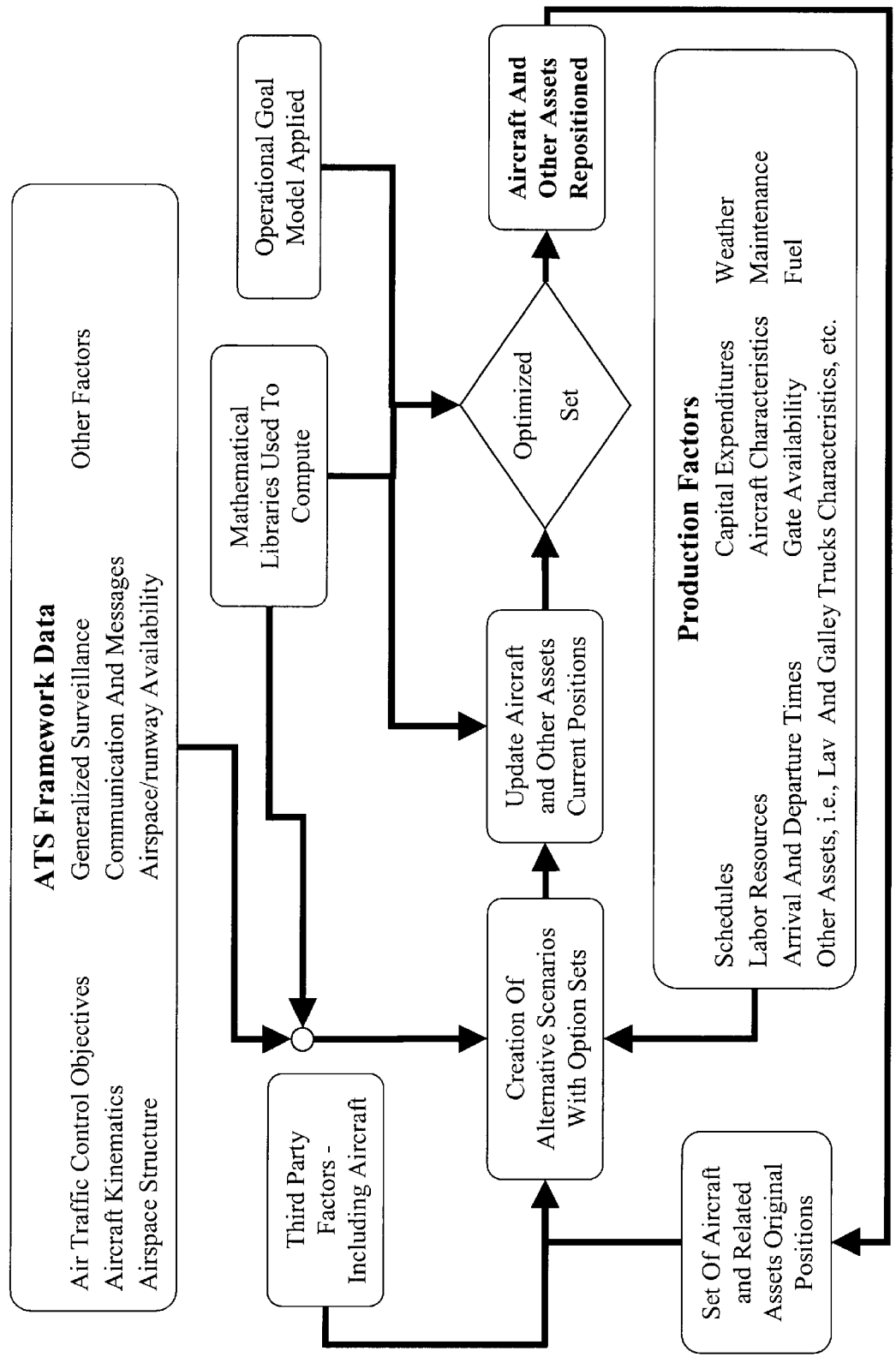
FIG. 9 – Sample Data Sets

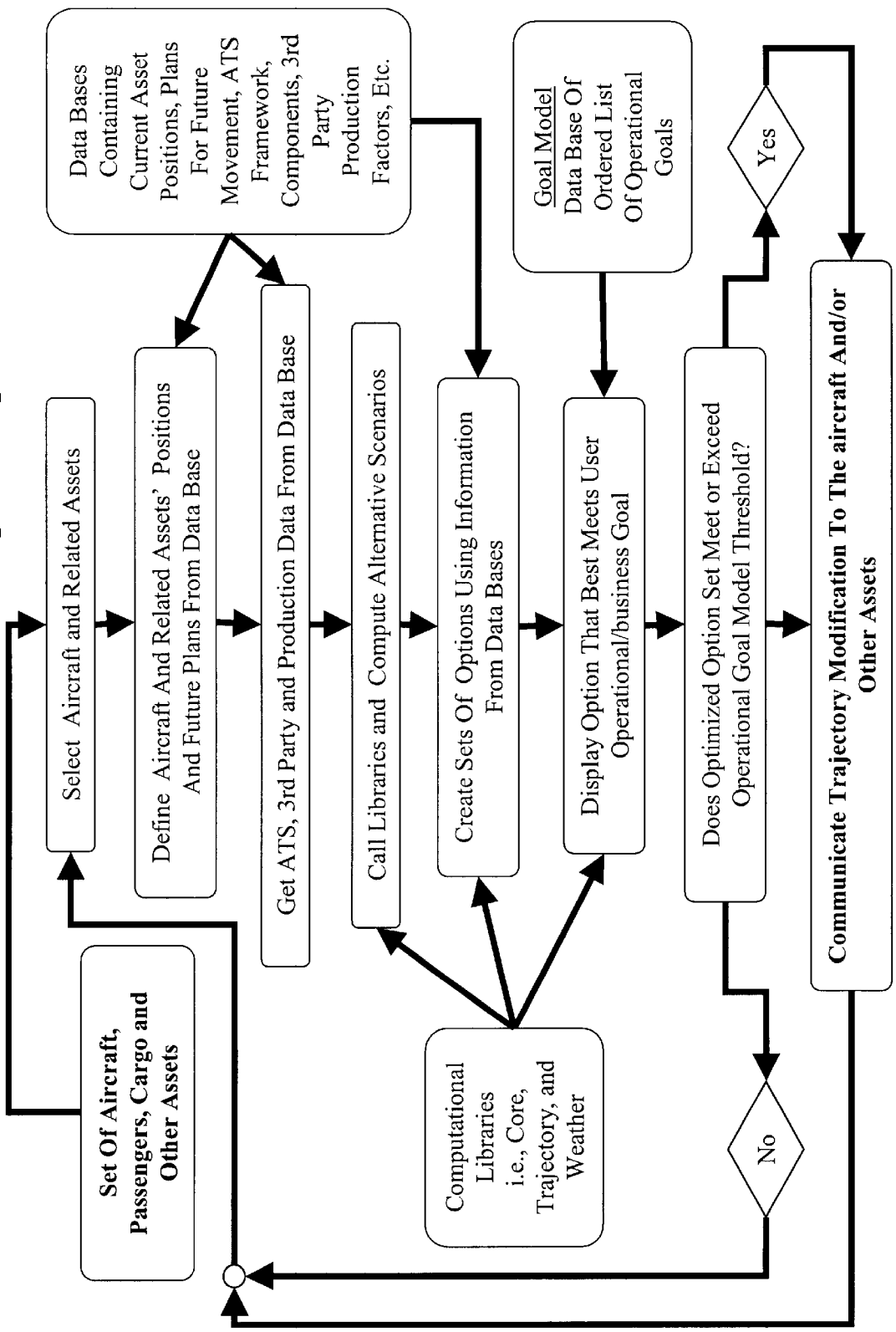
FIG. 10 - Method's Sample Computational Process

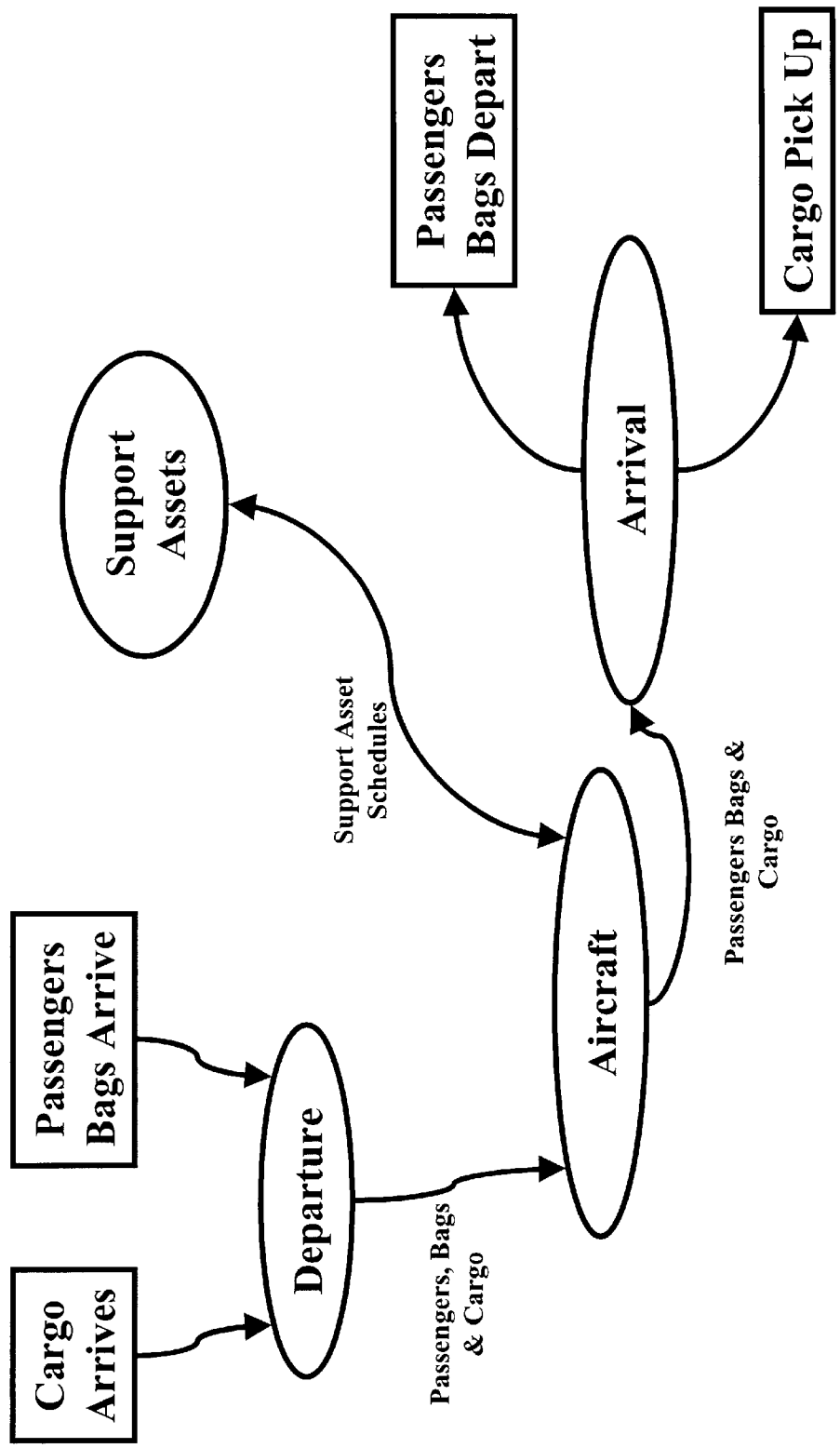
FIG. 11 – Top Level View of the Current Airline Production Processes

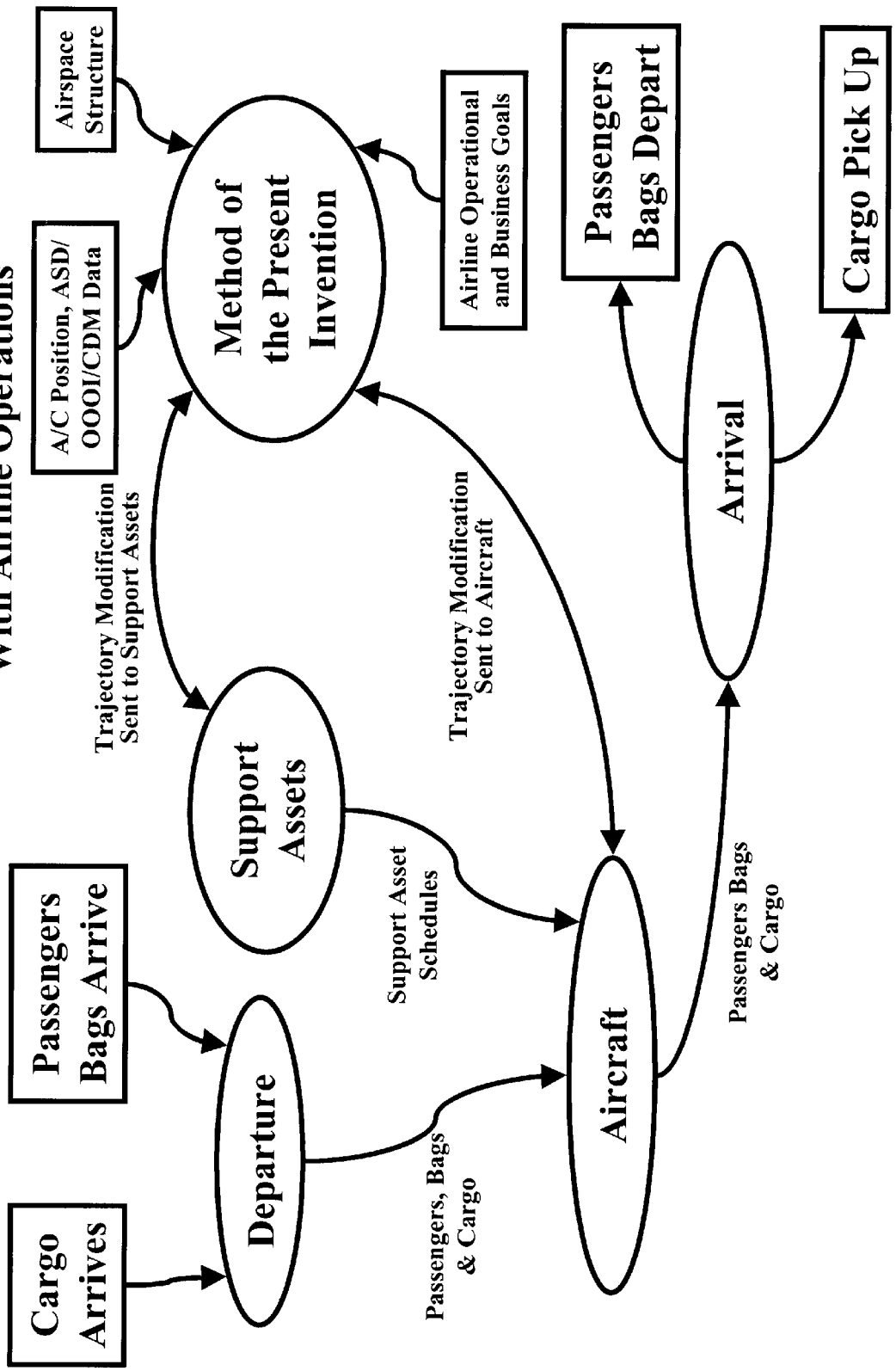

METHOD AND SYSTEM FOR TACTICAL AIRLINE MANAGEMENT

CROSS-REFERENCE TO RELATED APPLICATIONS

This application is related to the following U.S. Provisional Patent Applications: Application No. 60/129,563, filed Apr. 16, 1999 and entitled "Tactical Aircraft Management", Application No. 60/173,049, filed Dec. 24, 1999 and Application No. 60/189,223, filed Mar. 14, 2000, both entitled "Tactical Airline Management," and all these applications being submitted by the same applicants: R. Michael Baiada and Lonnie H. Bowlin. The teachings of these applications are incorporated herein by reference to the extent that they do not conflict with the teaching herein.

BACKGROUND OF THE INVENTION

1. Field of the Invention

The present invention relates to data processing and asset control systems. More particularly, this invention relates to methods and systems for tactically managing various airline functions and services to improve airline profitability. Considered functions and services include: safety; passenger/cargo servicing (e.g., ticketing, check in, checked baggage, security, aircraft loading, in-flight meal service, in-flight deplaning, interconnection to subsequent flights, bag sorting and delivery), aircraft servicing (e.g., fuel, lavatories, catering, cleaning, maintenance, deicing, bag/cargo loading), aircraft movement (e.g., pushback or power back, taxi, takeoff, climb, cruise, descent, approach, landing, parking) and support services (e.g., operation and maintenance of support vehicles, training, accounting, scheduling, payroll).

2. Description of the Related Art

The need for and advantages of management operation systems that optimize various business processes have long been recognized. Thus, many methods and optimization systems have been developed. For example, see U.S. Pat. Nos. 5,321,605, 5,369,570, 5,890,133 and 5,953,707.

However, few attempts have apparently been made to apply these methods and systems within the airline industry. The reasons for this situation are complex and varied, but include considerations such as: the complex interdependence of the airlines and their use of shared airport facilities, extensive governmental regulations, and the impact of the uncontrollable schedules of competitor's aircraft.

Like most businesses, the various airlines are segmented into a number of distinct types of business units or organizational entities. Although most airline processes are interdependent, current business practices within the airline industry promote the management of the individual assets independently by the individual asset managers without regard to an airline's overall goal of maximized profitability. This has traditionally meant that actions by an individual profit center (e.g., pilot scheduling), although attempting to increase its individual profit picture, often has the effect of reducing an airline's overall profits, efficiency, effectiveness and product quality (e.g., cancelled flights because there are not enough pilots). There appear to be few current attempts by the various airlines to make real time, tactical trade-offs between their business units that will maximize the airline's overall operational and business goals.

To better understand these airline processes, FIG. 1 has been provided to indicate the current airline passenger and cargo movement processes, which commence with passenger ticketing, followed by airport arrival, passenger loading, aircraft servicing (e.g., loading of fuel, food, and cargo) and ending after arrival at the terminal gate and delivery of baggage and cargo. It is of interest to note that the core process within the airline industry is the movement of the aircraft. It moves off the gate, then works towards the next gate, only to move off the gate again. Since almost each of the airline's other processes key off of the movement of aircraft, the core elements of an airline can be thought of as being managed from the center out as depicted in FIG. 2.

Although many airlines currently have in place data on the positions of their assets (e.g. Aircraft Situational Data, ASD and Passive Surveillance System, PASSUR), and the communications (e.g. ARINC Communications Addressing and Reporting System, ACARS) necessary to tactically manage these assets, they apparently lack the necessary business methods to utilize this data and these tools to tactically manage the repositioning and/or the use of the aircraft and other airline assets in the most profitable manner. Instead, current business practices involve the use of much of this data to predict when various aircraft will arrive at the next gate.

Despite the above noted prior art, the need continues to exist for improved methods and systems for managing various airline functions and services to improve airline profitability. The current airline problems and limitations enumerated above are not intended to be exhaustive, but rather are among many which tend to impair the effective management of airlines. Other noteworthy problems may also exist; however, those presented above should be sufficient to demonstrate the need for improvements airline business methods.

SUMMARY OF THE INVENTION

The present invention is generally directed to satisfying the needs set forth above and overcoming the limitations and problems identified with prior methods for managing various airline functions and services.

In accordance with one preferred embodiment of the present invention, a method for managing the assets of a user airline, based upon consideration of data regarding the status and needs of the user airline assets and passengers, the assets of competitor airlines, common shared assets, aircraft positions and the weather, to achieve specified business goals of the user airline, comprises the steps of: (a) collecting and storing this considered data, (b) processing this considered data to predict the trajectories of the user airline assets, along with a smaller set of their competitor's assets (e.g., aircraft), and the loads that these trajectories will place upon the assets of the user airline and the shared assets, (c) processing this considered data, predicted trajectories and loads to determine the capability of the user airline to meet these loads and needs while achieving user airline specified, business goals, (d) processing this considered data to create alternative, potential scenarios, these scenarios arising as a result of specifiable changes in the predicted trajectories of the user airline assets, wherein these scenarios include calculations for the changes in the loads caused by the changed trajectories, (e) processing and evaluating these alternative, potential scenarios to identify those scenarios which satisfy the asset loads, needs and specified business goals to a predetermined level, and (f) communicating these identified scenarios to user airline assets so that the trajectory changes may be implemented.

In a general sense, this embodiment of the present invention is a business method for tactically managing an airline's operational assets for transporting passengers, bags and cargo. The method of the present invention involves the continual monitoring of the global, real time status of aircraft (controlled and uncontrolled), along with other airline assets. It then compares the status of such assets with capabilities and needs of the individual assets and the overall airline's needs, along with the airline's ability to meet future demands. It then creates multiple alternative scenarios which would result from applying a given set of realistic changes to the current situation (i.e., speed up one aircraft and slow down another to mitigate congestion at an arrival airport; assign an aircraft to gate 35 versus gate 15), and when a scenario is identified which brings the airline's predicted outcomes substantially closer to the airline's operational and business goals, instructions are generated and communicated to the airline's individual asset managers (e.g., pilots, support service schedulers, gate schedulers, etc.) for corrective actions to achieve this scenario.

The present invention employs a novel method of utilizing the user airline's assets. That is, this novel method of utilizing the user airline's assets includes a substantially continuous process of monitoring and predicting both the location and time dependent characteristics of the airline assets, and adjusting the trajectory and/or utilization of such assets according to airline capabilities, system capacities and an overriding goal of better meeting the customer's needs and/or wants, and therefore the user airline's operational and business goals.

Effectively, the present invention generates the future trajectory of all of the airline's assets, identifies potential problems areas (e.g., the aircraft trajectory does not properly mesh with the passenger trajectory, gate trajectory or crew trajectory), creates alternative trajectories which better mesh in the future so that the needs and/or wants of the user airline's customers can be better met, and then provides a method to implement and monitor these new asset trajectory goals.

In accordance with another preferred embodiment of the present invention, a system, for managing the assets of a user airline which is based upon consideration of data regarding the status and needs of the user airline assets and passengers, the assets of competitor airlines, common shared assets, aircraft positions and weather in order to achieve the user airline's specified business goals, comprises: (a) a computer processor means, (b) a storage means for storing data on a storage medium, (c) a first means for initializing the storage medium, (d) a second means for processing the considered data to predict the trajectories of the user airline assets, along with a smaller set of their competitor's assets (e.g., aircraft), and the loads that these trajectories will place upon the assets of the user airline and the shared assets, (e) a third means for processing the considered data, predicted trajectories and loads to determine the capability of the user airline and shared assets to meet these loads and needs while achieving user airline specified, business goals, (f) a fourth means for processing the considered data to create alternative, potential scenarios, these scenarios arising as a result of specifiable changes in the predicted trajectories of the user airline assets, wherein these scenarios include calculations for the changes in the loads caused by the changed trajectories, and (g) a fifth means for processing and evaluating these alternative, potential scenarios to identify those scenarios which satisfy the asset loads, needs and specified business goals to a predetermined level.

Such a system provides a user airline with the capabilities to:

a) continuously evaluate the current position and operational status of both airline controlled assets and those assets which the airline cannot control, but which impact the airline's operation, b) predict the time each asset (controlled and uncontrolled) will reach a predetermined location, and in the case of the airline's controlled assets compare this to the airline goals and/or needs, c) compare the predicted unaltered trajectory of assets to the airline's capabilities and operational and business goals, d) compare the predicted unaltered trajectory of assets to system capacities (runways, airspace constraints, etc.), e) analyze alternative scenarios to look for a solution that better meets the operational and business goals of a user airline, f) display the chosen solution to a system operator who can accept or modify the proposed solution, g) communicate the new goals to each of the controlled asset operators of the user airline, h) continuously monitor the system to identify any changes to the system or an action by one of the assets that prevents achievement of a more optimized solution, and i) measure the airline's overall performance.

It is therefore an object of the present invention to provide a method and system for managing specified airline assets to achieve specified airline business goals so as to overcome the limitations of the prior art described above.

It is another object of the present invention to present a method and system for the tactical management of an airline that takes into consideration a wider array of parameters and factors that heretofore considered. For example, such parameters and factors may include: passenger's itineraries, aircraft related factors (e.g., speed, fuel, altitude, route, turbulence, winds, weather), ground services (e.g., passenger connections, maintenance, gate availability, passenger loading and deplaning, cargo, bags labor resources available), scheduling (e.g., seats availability, pricing), common asset availability (e.g., runways, airspace, ATC services) and competitors needs for use of the common assets (uncontrolled aircraft requiring access to the common assets).

It is a yet another object of the present invention to provide a method and system that will enable an airline to increase profits and customer satisfaction, while reducing other risks and costs—increased quality, decreased costs—the best of both worlds.

It is a further object of the present invention to provide a method and system that will allow an airline to enhance its overall operating efficiency, even at the possible expense of its individual components that may become temporarily less effective. After an airline's overall operation is optimized, then, as a secondary task, the present invention tries to enhance the efficiency of an airline's individual components as long as they do not degrade the overall, optimized solution.

It is a still further object of the present invention to provide a method and system (process or operating model) that analyzes numerous tactical information and other factors simultaneously, identifies system constraints and problems as early as possible, determines alternative possible trajectory sets, chooses the better of the evaluated asset trajectory sets, implements the new solution, and continuously monitors the outcome.

These and other objects and advantages of the present invention will become readily apparent as the invention is better understood by reference to the accompanying drawings and the detailed description that follows.

BRIEF DESCRIPTION OF THE DRAWINGS

FIG. 1 illustrates the various steps and tasks necessary in the operation of an airline.

FIG. 2 illustrates some of the elements that must be managed by an airline as they are centered around the movement of aircraft.

FIG. 3 illustrates the decision steps involved in the control of an airline's assets in one embodiment of the method of present invention.

FIGS. 4a–4c present a table illustrating the decision processes required to meet the airline customers' needs and wants.

FIGS. 5a–5e provides a more detailed, tabular description of the decision making process to determine recommended gate arrival times.

FIGS. 6a–6d provide a flow diagram of a sample computational method of the present invention.

FIG. 7 illustrates some of the data monitoring and accumulation steps associated with the process of the present invention.

FIG. 8 illustrates an airline's operations by focusing on those tasks and resources associated with a particular aircraft.

FIG. 9 illustrates the various types of data that is used in the process of the present invention.

FIG. 10 illustrates the various computational processes that are associated with the process of the present invention.

FIG. 11 illustrates some of the principal tasks that are currently being directly managed in the operation of a typical airline.

FIG. 12 illustrates the primary interaction between the process of the present invention and the tasks shown in FIG. 11.

DEFINITIONS

ACARS—ARINC Communications Addressing and Reporting System. This is a discreet data link system between the aircraft and airline. This provides very basic email capability between the aircraft and a limited sets of operational data and personnel. Functionality from this data link source includes operational data, weather data; pilot to dispatcher communication, pilot to airport data, OOOI data, etc.

Aircraft Situational Data (ASD)—This an acronym for a real time data source (approximately 5 minute updates) provided by the Federal Aviation Administration comprising aircraft position and intent for the aircraft flying over the United States and beyond.

Airline—a business entity engaged in the transportation of passengers, bags and cargo on an aircraft.

Airline Arrival Bank—A component of a hub airline's operation where numerous aircraft, owned by the hub airline, arrive at a specific airport (hub airport) within in a very short time frame.

Airline Asset—To include physical assets such as aircraft, gates, tugs, baggage carts, etc., as well as labor resources such as pilots, cleaners, mechanics, etc. As well as work-in-progress assets, such as passengers, bags and cargo.

Airline Asset Trajectory—The movement or usage of any of the airline's assets defined as a position, time (Past, present or future) or usage requirement. For example the trajectory of an aircraft is depicted as a position and time, while the trajectory of a gate is depicted as being in use or not based on time alone.

Airline Departure Bank—A component of a hub airline's operation where numerous aircraft, owned by the hub airline, depart at a specific airport (hub airport) within a very short time frame.

Airline Gate—An area or structure where airlines park their aircraft for the purpose of loading and unloading passengers and cargo.

Air Traffic Control System (ATC)—A system to assure the safe separation of moving aircraft controlled by a country's government. In the United States the federal agency responsible for this task is the Federal Aviation Administration (FAA).

Arrival Fix/Cornerpost—At larger airports, the FAA has instituted structured arrivals that bring all arrival aircraft over geographic points (typically 4). These are typically 30 to 50 miles from the arrival airport and are separated by approximately 90 degrees. The purpose of these arrival fixes or cornerpost is so that the controllers can better sequence the aircraft, while keeping them separate from the departing flow of aircraft. In the future it may be possible to move these merge points closer to the airport, or eliminate them all together. In this case the arrival fix cornerpost referred to herein will be the point where the aircraft flows merge prior to landing.

Automatic Dependent Surveillance (ADS)—A data link surveillance system currently under development. The system, which is installed on the aircraft, captures the aircraft position from the navigation system and then communicates it to the FAA it other aircraft.

Block Time—The time from aircraft departure to arrival. This can be either scheduled block time (scheduled departure time to scheduled arrival time as posted in the airline system schedule) or actual block time (time from when the aircraft door is closed and the brakes are released at the departure station until the brakes are set and the door is open at the arrival station).

Cooperative Decision-Making (CDM)—A recent program between FAA and the airlines wherein the airlines provide the FAA a more realistic schedule of their aircraft. For example if an airline cancels 20% of its flights into a hub because of bad weather, it would advise the FAA. In turn, the FAA compiles the data and redistributes it to all participating airlines.

Common Assets—Airline assets that must be utilized by the user Airline and competitor airlines, and which are usually controlled by the government (e.g., FAA). These assets are not controlled by any airline (e.g., runways, ATC system, airspace, etc.). Common assets must also be used by the user Airline's direct competitors Controlled Asset—An airline asset owned by, and or one that can be controlled by a particular Airline. Controlled assets are ones that the Airline can exercise a level of control as to its trajectory, movement, usage, and or other operational factors. An example of a controlled asset is an Airline's aircraft.

Federal Aviation Administration—The government agency responsible for the safe separation of airline aircraft while they are moving.

Four-dimensional Path—The definition of the movement of an object in one or more of four dimensions—x, y, z and time.

Hub Airline—An airline operating strategy whereby passengers from various cities (spokes) are funneled to an interchange point (hub) and connect to various other cities. This allows the airlines to capture greater amounts of traffic flows to and from cities they serve, and offers smaller communities one-stop access to literally hundreds of nationwide and worldwide destinations.

OOOI—A specific airline data set of; when the aircraft departs the gate (Out), takes off (Off), lands (On), and arrives at the gate (In). These times are typically automatically sent to the airline via the ACARS data link, but could be collected in any number of ways.

PASSUR—A passive surveillance system usually installed at the operations centers at the hub airport by the hub airline. This device allows the airline's operational people on the ground to display the airborne aircraft in the vicinity (up to approximately 150 miles) of the airport where it is installed.

Strategic Management—The use of policy level, long range information (current plus time up to "n1" months into the future, where "n1" is defined by the user airline, typically 6 months) to set schedules and future requirements.

Tactical Management—The use of real time information (current plus time up to "n" hours into the future, where "n" is defined by the user airline, typically 24 hours) to modify future events.

Trajectory—See airline asset trajectory and four-dimensional path above.

Uncontrolled Asset—An airline asset that is not owned by, and or one that can not be controlled by a particular Airline. Uncontrolled assets are ones that the Airline cannot exercise any level of control as to movement usage and or other operational factors. An example of an uncontrolled asset is an airline competitor's aircraft.

User Airline—The term user airline and airline be will be used interchangeably to denote an airline utilizing the present invention for enhancing its operational effectiveness and efficiency.

DESCRIPTION OF THE PREFERRED EMBODIMENT

Referring now to the drawings wherein are shown preferred embodiments and wherein like-reference numerals designate like elements throughout, there is shown in FIGS. 6a–6d the decision steps involved in one embodiment of a method of the present invention. This method effectively manages the assets of a user airline, based upon consideration of data regarding the status and needs of the user airline assets and passengers, the assets of competitor airlines, common shared assets, aircraft positions and the weather, to achieve specified business goals of the user airline.

In a preferred embodiment, this method comprises the steps of (a) collecting and storing this considered data, (b) processing this considered data to predict the trajectories of the user airline assets, along with a smaller set of their competitor's assets (e.g., aircraft), and the loads that these trajectories will place upon the assets of the user airline and the shared assets, (c) processing this considered data, predicted trajectories and loads to determine the capability of the user airline to meet these loads and needs while achieving user airline specified, business goals, (d) processing this considered data to create alternative, potential scenarios, these scenarios arising as a result of specifiable changes in the predicted trajectories of the user airline assets, wherein these scenarios include calculations for the changes in the loads caused by the changed trajectories, (e) processing and evaluating these alternative, potential scenarios to identify those scenarios which satisfy the asset loads, needs and specified business goals to a predetermined level, and (f) communicating these identified scenarios to user airline assets so that the trajectory changes may be implemented.

As discussed above, the overall goal of the present invention is to increase airline profitability through the tactical management of an airline's assets from a system perspective. It is important to note that the present invention is in some ways the combination of six business management processes. These six processes working cooperatively together improve asset productivity while decreasing costs, thus greatly improving profitability. These six processes include:

1) A four-dimensional (4D, i.e., three spatial directions and time) asset tracking process that looks at the current status of all assets—controlled and uncontrolled, 2) An asset look ahead and predicative process, 3) An initial goal function process that dynamically combines the operational and business goals of the user airline, the predicated demands of both the airline's assets and the airline competitor's assets on the user airline and the common assets (i.e., runways, ATC system assets, airspace, etc.), known constraints to the trajectory of the airline's resources, the current asset status and capabilities, the knowledge provided from the asset tracking and prediction processes;

4) A subsequent goal function process that generates and looks at numerous alternative solutions, chooses one solution that suggests realistic modifications to the current state of the controlled assets to improve the predicted and actual outcome in relation to the airline's operational and business goals and allows a system operator to approve, modify or ignore the displayed solution;

5) A communication process that notifies each asset manager of his or her new performance goal, and 6) A closed loop monitoring process, which continually monitors the current state of the system before and after the combination of the above parts of the process have been exercised. This monitoring process measures the current state of the assets against their ability to meet the new operational and business goals generated. If at such time actions by one of the assets, controlled or uncontrolled, or any other real time factors would preclude the meeting of the new operational and business goals, the system operator is notified.

FIG. 3 provides a flow diagram that represents the decision steps involved in the control of the assets in one embodiment of the method of present invention. It denotes (step 101) how the present invention must first determine if the Customer's needs and/or wants are met. In step 102, this method is seen to evaluate all of the trajectories of an airline's assets to determine if changes to these trajectories would yield a solution where more of the customer's needs and/or wants would be fulfilled. If this cannot be done, this method involves then jumping to step 106.

If modifications to the trajectories of the airline's assets can produce a better match to the customer's needs and/or wants, the cost of these changes must be compared to the benefit produced (step 103). If the cost does not justify the changes to the trajectory, the process must default to step 106 once again.

Conversely, if the cost of modifications to one or more of the trajectories of the airline's assets is lower then the benefit produced, the method then entails communicating the new trajectory goals to the individual airline assets (step 104).

Finally, the method involves monitoring the assets to determine if each of the airline's assets will meet their current/new trajectory goal (step 105). This method continuously analyzes airline assets from present time up to "n" hours into the future, where "n" is defined by the user airline. The overall time frame for each analysis is typically twenty-four hours, with this method analyzing the hub arrival bank at least three to five hours into the future.

Thus, this method is seen to avoid the pitfall of sub-optimizing particular parameters. Fuel burn, for instance, is not optimized at the expense of missing large numbers of connecting flights. This method accomplishes this by assigning values to each of the goal function variables so that the correct trade-off is made to insure the higher profitability level.

While the present invention is capable of providing a linear solution to the process, it is recognized that a multi-dimensional solution capable of managing all of the inter-dependent assets simultaneously provides a better, more profitable solution. Additionally, while it is recognized that the present invention manages the airline's assets (linearly, multi-dimensionally, or both) as a system, for ease of understanding and implementation, the described implementation of the present invention contained herein separates the overall system optimization into the three sub-processes described below:

Sub-Process #1—Passenger departure processes to include: travel planning, ticket purchase, arrival at the departure curb, bag check, check-in, security checks and movement to the aircraft boarding/loading area, Sub-Process #2—Aircraft processes to include: aircraft servicing (cleaning, fueling, cargo/bag loading, maintenance, etc.), passenger boarding, aircraft movement (pushback, taxi, departure, takeoff, enroute, arrival, landing, taxi) and deplaning, and Sub-Process #3—Passenger arrival processes to include: departure of the aircraft boarding/loading area, movement to the baggage claim and/or departure area, baggage claim, and movement to the destination curb.

Additionally, since all these sub-processes are similar, regardless of the implementation breakdown of these sub-processes, only Sub-Process #2 (as defined herein) is described in detail.

Next, since the implementation of the method of the present invention uses a multi-dimensional solution that evaluates numerous parameters simultaneously (as opposed to a linear implementation that sequentially evaluates single parameters one at a time), the standard yes-no flow chart is difficult to construct. Therefore, spreadsheet, decision tables have been included to better depict the implementation of the present invention.

FIGS. 4a–4c provides a tabular description of the decision processes required to meet an airline customer's wants and/or needs. Decision 1 is seen to involve a number of parameters that quantify a customer's needs and/or wants. Decision 2 involves the three sub-processes required to meet the customers needs and/or wants. Under each of these three sub-process groups, the decision making process is further broken down to a list of the representative individual processes within each of the sub-process groups that an airline must implement to meet the customers needs and/or wants.

FIGS. 5a–5e provides a more detailed, tabular description of the sub-process 2: Aircraft Process. It describes the order of the decision making process within the implementation of one embodiment of the present invention. Decision 1—Tactical Intra-Aircraft Decisions, involves determining the aircraft's needs and/or wants. Each of the individual aircraft's needs and/or wants must be evaluated and balance against the aircraft's other needs and/or wants. FIGS. 5a–5e is the heart of the multi-dimensional implementation of this embodiment of the present invention.

For example, the need to arrive on time must be balanced against the required gate time to assure all of the gate functions can be accomplished to assure the next on-time departure, while evaluating the need to use minimum fuel to reduce costs. For example, if a flight is delayed at the departure station (for any number of reasons) for five minutes, but also needs to arrive four minutes early to assure the next departure, absence modifications to the aircraft trajectory, the flight will be nine minutes behind its preferred trajectory.

Current business management practices within the airline industry do not provide for this required nine minute correction on a system basis, except for block time increases in the system schedule (a strategic process with a three to six month lead-time) or possible actions by individual pilots. Therefore, this hypothetical flight would arrive five minutes late, and then depart again nine minutes late.

However, as shown in FIG. 5b, Decision 1, the present invention would evaluate such a flight's ability to speed up based on fuel availability, ride conditions, etc., to determine if aircraft trajectory modifications are possible and desirable. As can be seen in FIG. 5b, Decision 1, upwards of twenty aircraft parameters must be balanced simultaneously to maximize the profitability of the aircraft. This is quite different than current business practices with in the airline industry which usually focus decision making on a very limited data set, i.e., scheduled on-time arrival, and possibly one other parameter—fuel burn, if any at all. Additionally, the current business practice typically will only look at a local optimization (e.g., fuel usage) without regard to the total system optimization.

This embodiment of the present invention recognizes that the tactical requirements of each of the listed parameters has an effect on the real-time decision of what time the aircraft should arrive at the gate. However, it should be noted that the decision-making process represented in Decision 1 of FIG. 5b is only evaluating the aircraft arrival time in a perfect world—no weather, no other aircraft interferences, no external constraints to the aircraft trajectory. This unrealistic situation will need to be addressed in the later stages of the decision-making process.

To illustrate how this is accomplished, let's assume that using the FIG. 5b, Decision 1 process, a flight wants to arrive at gate 25 at 08:10 AM. Once the perfect world, optimal gate arrival time has been determined for each aircraft of an airline, the next step is to evaluate the airline's ability to meet the needs and/or wants of the individual aircraft. This is done at the step illustrated in FIG. 5c, Decision 2—Tactical Intra-Airline Decisions. Here, this decision making process evaluates the airline's ability to meet the needs of its individual aircraft, while also considering their possible interactions with the user airline's other aircraft and its competitor's aircraft that are approaching the same particular airport.

It can be noted that this step is made more difficult because of the airlines' desires to run hub operations. Such hub operations typically schedule thirty to sixty of the user airline's aircraft to arrive at a single airport in a very short period of time. The aircraft then exchange passengers, are serviced and then take off again. The departing aircraft are also scheduled to takeoff in a very short period of time. Typical hub operations are one to one and a half hours in duration and are repeated at the hub airport eight to twelve times per day. Thus, such hub operation puts a larger burden on the ground assets of an airline, while almost guaranteeing that individual actions taken by asset managers without regard to system optimization will actually degrade the operational outcome. This lack of system optimization of the multi-variable, hub arrival and departure system almost assures a "Ping-Pong" or ripple effect as is seen in the airline industry today (wherein the terms "Ping-Pong" and "ripple effect", are understood to mean that an action by one unit within a multi-unit system has an unintentional, and often detrimental, effect on another unit within that same system).

For our hypothetical flight that wants to be at gate 25 at 08:10 AM, let's further assume that at 06:10 AM, it is recognized that the aircraft preceding this flight is late and will not arrive on gate 25 until 07:45 AM, and will be on gate 25 until 08:15 AM. Rather than delay the arrival of our 08:10 flight, a possible better choice would be to direct this flight into another gate, but, in this example, let's further assume that, because of the hub operation, all other gates are scheduled to be used until at least 08:20 AM. Given the airline's inability to meet the 08:10 flight's need for a gate at 08:10 AM, the best available solution may be to slow the flight down to save fuel. Thus, after the airline's ability to meet the aircraft's needs and/or wants is added to the solution, this process recommends that the decision be made to change the flight's gate arrival time from 08:10 AM to 08:15 AM.

However, this decision making process continues, as shown in FIG. 5d, Decision 3, to "Tactical External Airline Decisions." These parameters are typically not under the direct control of the airline. An example of an external constraint is the airport landing rate.

Building on the above example, let's further assume that the hub arrival airport can typically land seventy-eight aircraft per hour, but because of low visibility weather conditions, this number has been reduced to sixty-two landings per hour. Because of this external constraint, the present decision making process must evaluate changing the trajectories of the controlled, arrival aircraft to meet the external constraint of sixty-two landing per hour, while still meeting, as best as possible, the parameters in the FIG. 5b and FIG. 5c, Decision 1 and 2 steps. Thus, it is probable that this external constraint will result in the decision being made to speed-up some aircraft in order to meet earlier arrival times, while others are slowed down. As a result of this Decision 3 step, let's further assume that the trajectory of our hypothetical flight is changed so that the flight is now given a final gate arrival time of 08:26 AM.

A unique aspect of this embodiment of the present invention is that it provides a means to now convert this new gate time to a manageable control action that can be carried out by the asset managers (the pilots)—speeding-up or slowing-down, as necessary, to arrive at the new gate time and consequently a new cornerpost arrival time, which we'll now assume to be set for our hypothetical flight to 07:57 AM.

This decision making process is further illustrated in FIGS. 6a–6d, where we see a representative flow diagram of the decision making or computational steps taken in the process described above. In step 301, data is captured from the population of aircraft, passenger, freight, and related assets. These data sets are obtained as a prelude for the various actions intended to optimize the airline's performance.

In step 302, one aircraft is selected to analyze. While in reality, the selection of the first aircraft, and the next and the next could be arbitrary; one method of selection could be based on the aircraft closest to the arrival airport In step 303, the unaltered trajectory of the selected aircraft is calculated. This process is used to determine, for each of the monitored assets, the predicted outcome of an unaltered trajectory.

The data for input into this process comes from a number of sources, including: Automatic Dependent Surveillance (ADS), FAA's Aircraft Situational Data (ASD), airline operation's computers, and gate system computers. This data monitoring and accumulation task is depicted in FIG. 7. After the data concerning each aircraft and/or asset is collected, readily available computer programs (e.g., "Aeralib," from Aerospace Engineering & Associates, Lanham, Md.) are used to generate the various unaltered scenarios.

In step 304, the operational requirements for a selected aircraft (e.g., on-time requirement, gate requirement, ground service required, passenger connections, crew legality, ramp service requirements, maintenance, etc.) are used to create alternative flight scenarios (trajectories). In step 305, each of the trajectories are evaluated for operational "goodness". Each trajectory is evaluated to assure that it does not exceed the operational limits of the aircraft (e.g., since it requires additional fuel to speed up to arrive early, the aircraft must have the additional fuel necessary to perform the modification called for by the present invention). Those trajectories that exceed operational parameters (as defined by the operator) are removed from the set of alternative scenarios to be evaluated. For example, a trajectory that requires the aircraft to fly faster or slower than physically possible is discarded. This assures that each alternative scenario that is to be further evaluated represents a realistic set of options for the assets involved.

In step 306, for the selected aircraft, each scenario is compared to the other possible trajectories to identify a scenario which better meets the aircraft's needs and/or wants. Once this scenario is selected, the flight's associated gate arrival time is tentatively set. Step 307 then begins this process anew for each of the aircraft until all of a hub's arriving aircraft have a tentative gate arrival time.

In step 308, these tentative gate arrival times are used to determine if the airlines other assets and sub-processes can meet the needs and/or wants of each aircraft (e.g., it is of little value to move an aircraft ahead in time if a gate will not be available). If all of the aircraft's needs and/or wants can be met (an unlikely scenario), the tentative gate arrival times are carried forward.

If the airlines other assets and sub-processes cannot meet all of the needs and/or wants of each aircraft, still more alternative trajectories are created for each of individual aircraft. Essentially, the process in steps 304 through 307 are repeated now taking into consideration the airline's capabilities to handle all of the arriving aircraft.

In step 308, an airline's hub asset capabilities are considered to determine whether these tentative gate arrival times are really practical and advisable in view of an airline's limited hub asset capabilities and the operational and business goals of the airline. Step 309 is somewhat analogous to step 308. Whereas in step 308 this process involved evaluating airline's hub capabilities, step 309 involves evaluating the external airspace capabilities to meet an aircraft's needs and/or wants as modified by 308. Alternative trajectories are again evaluated for the aircraft in relation to airspace constraints while searching for a set of trajectories that better meets the airline's business and operational goals.

For example, simply because all of the aircraft want to arrive on time and the airline can handle them all on time (i.e., gates and personnel available), it doesn't mean that it is physically possible to do so given the runways available. Imagine a snowstorm that cuts airport arrival capacity by 50%. Obviously, some of the aircraft must be slowed down.

The process of this embodiment of the present invention strives to find a trajectory set that slows down those aircraft that may not have gates or fewer passenger connections, etc. or speeds up aircraft to arrive early that have gates available. Once a set of gate arrival times is found that better meets the airline's operational and business goals, these new, optimized gate arrival time over-ride the prior, tentative gate times.

These new, gate arrival times may be converted to corresponding cornerpost arrival times. Using the example above, the hypothetical flight's new gate arrival time of 08:26 AM is converted into a cornerpost arrival time of 07:57 AM.

As shown in step 311, such a time may be displayed to a system operator. If approved by the system operator, these modifications to the trajectories are communicated to the appropriate asset managers. In step 312, all of the airline's other assets are notified of these final, optimized gate arrival times.

Because many of the parameters and factors that go into this decision making process are constantly changing, a final step 313 is necessary to continuously monitor these input data sources to ensure that deviations to these parameters beyond specified tolerance levels will result in the optimization of the aircrafts' trajectories.

As depicted in FIG. 1, an airline's operations may be considered as a stepwise process that starts when the passenger selects a destination and books a flight. A ticket is purchased. The passenger, arriving at the airport, may check bags at the curb or inside; checks in and receives a seat and gate assignment; and then proceeds through security to gate and then check in. During this time cargo arrives at the airport.

Passengers are loaded into airplane after the cleaners complete their tasks and flight attendants arrive. Meanwhile, aircraft servicing is underway. This includes: loading bags, cargo, food, and fuel; arrival of pilots; completion of maintenance activities; servicing lavatories; and completion of other necessary services.

Just before departure, the aircraft's cabin door is secured. Now the aircraft is ready to depart once all other servicing is complete. The aircraft departs the gate and taxis to the runway. It then takes off and flies to the destination. Upon landing the aircraft must taxi to the arrival gate. Arriving at the destination gate the passengers depart, bags and cargo are deplaned; and passengers retrieve bags and/or proceed to the curb ready to depart the airport.

FIG. 8 further illustrates an airline's operations by focusing on those things associated with a particular aircraft. Before passengers can be loaded the cleaners must complete their tasks and the flight attendants must be on the aircraft. Once passengers are loaded the cabin door is closed. The aircraft departs the gate by taxing to the take off runway. Prior to or after taking off and while enroute to a cornerpost arrival, the method of the present invention results in assigning a specific cornerpost arrival time to each aircraft. The asset operator (pilot) then has numerous options concerning the best methods for either speeding-up or slowing-down to meet the assigned arrival time. The aircraft lands and then taxies to the gate. The aircraft, upon arrival at the gate opens the door, bags and cargo are deplaned, and passengers deplane. At this point the aircraft is serviced. And the process begins anew.

FIG. 9 illustrates the various types of data that is used in this decision making process, these include: air traffic control objectives, generalized surveillance, aircraft kinematics, communication and messages, airspace structure, airspace and runway availability, labor resources, aircraft characteristics, arrival and departure times, weather, gate availability, maintenance, other assets—i.e. lavatories and galley trucks characteristics, and airline operational and business goals.

FIG. 10 illustrates the various computational processes that are associated with this method. Starting with a set of aircraft, passengers, freight, and related assets, an aircraft and related assets are selected. Then the aircraft and its related assets' positions and future plans are identified with input from databases containing current asset positions, plans for future movement, ATS framework, components, third party data, production factors, etc. An assortment of relatively standard software programs may be used to compute an aircraft's alternative trajectories or flight scenarios. Such alternatives for all of an airline's aircraft approaching a particular hub are then combined to yield the option sets for an airline. An airline's prioritized and ordered list of operational goals are then used to evaluate the various option sets so as to identify a set that better meets the airline's operational and business goals. As a result of this process, an airline's aircraft are repositioned, assuming that the optimized option set exceeds a specified operational goal threshold. If it does not the process begins anew.

FIG. 11 displays the various tasks that are currently being managed, mostly independently, in the operation of a typical airline, these include the tasks associated with on-ground support, the arrival and the departure of the airline's aircraft.

A key advantage of the process of the above described embodiment of the present invention is that it takes into consideration a more complete picture of the various factors that can effect the optimal operation of an airline, including a user airline's controlled assets, as well as other third party/competitor's aircraft and assets which are usually vying for access to an airport's common assets. Use of the process of the present invention is fundamentally different than the piece-wise decision processes that are currently being used in the airline industry, which may often sub-optimize a particular objective, such as the passenger boarding process, without regard to the cargo loading process.

Thus, this overall optimization phase and the present invention's ability to direct the outcome of future events is seen to be at the core of the process of the present invention. Its output directs the trajectory modification of an airline's aircraft and related assets.

It should be noted that it is a unique aspect of the present invention that instead of merely processing currently available data to predict future events (e.g., gate arrival times) as is done by the current art, the method of the present invention actually works to modify the trajectories of the user airline's interdependent assets (speed up or slow down) to tilt the future outcome of certain events (hub arrival sequence) to the benefit of the user airline. Additionally, the present invention does this from a total system perspective, coordinating the directed actions to minimize system interference. In other words, the present invention works to coordinate and direct the outcome of a group of interdependent actions, rather than simply predicting what that outcome might be.

FIG. 12 illustrates this process's interaction points with the standard airline operational steps. This process is seen to receive input from the ASD/OOOI/CDM data, airspace structure data, and the user airline's operational and business goals, and to communicates trajectory modifications to the airline's aircraft and its ground support assets.

To better understand how this process' optimization routine may be performed, consider the following mathematical expression of a typical scheduling problem in which a number of aircraft, 1 ... n, are expected to arrive to a given point at time values $t_1 \ldots t_n$. They need to be rescheduled so that:

1. The time difference between two arrivals is not less than some minimum, $\Delta$;
2. The arrival times are modified as little as possible;
3. Some aircraft may be declared less "modifiable" than others.

We use $d_i$ to denote the change (negative or positive) our rescheduling brings to $t_i$. We may define how "good" (or rather "bad") our changes are for the whole aircraft pool as $$G_1 = \Sigma_i |d_i/r_i|^K$$

where $r_i$ are application-defined coefficients, putting the "price" at changing each $t_i$ (if we want to consider rescheduling the i-th aircraft "expensive", we assign it a small $r_i$, based, say, on the number of passengers, cost of operation, time remaining to scheduled arrival, other factors), thus effectively limiting its range of adjustment. The sum runs here through all values of i, and the exponent, K, can be tweaked to an agreeable value, somewhere between 1 and 3 (with 2 being a good choice to start experimenting with). The goal of the present invention is to minimize $G_1$ as is clear herein below.

Next, we define the "price" for aircraft being spaced too close to each other. For the reasons, which are obvious further on, we would like to avoid a non-continuous step function, changing its value at $\Delta$. A fair continuous approximation may be, for example, $$G_2 = \Sigma_{ij} P((\Delta - |d_{ij}|)/h)$$

where the sum runs over all combinations of i and j, h is some scale factor (defining the slope of the barrier around $\Delta$), and P is the integral function of the Normal (Gaussian) distribution. $d_{ij}$ stands here for the difference in time of arrival between both aircraft, i.e., $(t_i+d_i)-(t_j+d_j)$.

Thus, each term is 0 for $|d_{ij}| \gg \Delta+h$ and 1 for $|d_{ij}| \ll \Delta-h$, with a continuous transition in-between (the steepness of this transition is defined by the value of h). As a matter of fact, the choice of P as the Normal distribution function is not a necessity; any function reaching (or approaching) 0 for arguments $\ll -1$ and approaching 1 for arguments $\gg +1$ would do; our choice here stems just from the familiarity.

A goal function, defining how "bad" our rescheduling (i.e., the choice of d) is, may be expressed as the sum of $G_1$ and $G_2$, being a function of $d_1 \ldots d_n$:

$$G(d_1 \ldots d_n) = K\Sigma_i C_i d_i^2 + \Sigma_{ij} P((\Delta - |d_{ij}|)/h)$$

with K being a coefficient defining the relative importance of both components. One may now use some general numerical technique to optimize this function, i.e., to find the set of values for which G reaches a minimum. The above goal function analysis is applicable to meet many, if not all, of the goals desired by an airline.

Finally, to better illustrate the differences between the present invention and the prior means used for managing an airline, consider the following examples:

Example 1—A pilot typically decides what speed to fly and how much fuel to use based on broad airline policies using a very limited view of the pertinent data. For example, an aircraft from Boston is predicted to arrive late into San Francisco, thus misconnecting five passengers for their flight to Hong Kong. Suppose the pilot has the ability to increase speed to allow the arrival in San Francisco early enough for these connecting passengers to board the Hong Kong flight. To do this the pilot would have to use an additional $1,000 of fuel.

Conversely, if the passengers misconnect to the Hong Kong flight, the airline engenders an additional cost of $1,200. Obviously the pilot should use the extra fuel to arrive in time to assure that the 5 passengers may board the Hong Kong flight, thus saving the airline $200.

This example represents a fairly simple decision making process. Unfortunately, even this simple decision is not often made because the information needed is often not made available to the right people, or if the data is available, the people making the decisions do not have the ability to process the data.

Often, little thought is given to other real time factors that could effect the outcome of the arrival time (i.e., the arrival flow demand versus capacity at San Francisco). Suppose that the message was sent to the pilot concerning the Hong Kong connections, but the airline ignored the fact that at the time the aircraft approached San Francisco, numerous other aircraft, including the airline's competitors, were also arriving in San Francisco, pushing arrival demand above arrival capacity. If more aircraft arrive at the airport than the airport can safely land, the system becomes congested. Congestion causes delays and backups.

In this example, the initial analysis considered only a single factor, while other factors precluded the passengers' connections. The airline spent $1,000 for extra fuel, while still misconnecting the passengers, thus costing the airline a total of $2,200.

The process of the present invention could provide a predicted scenario for at least "n" hours into the future, as the Boston to San Francisco flight is ready to depart Boston. It would identify the constraint points and analyze alternate asset trajectory scenarios to mitigate these constraints to assure that there was an available landing slot, an available gate, and services required for the connecting passengers to make the Hong Kong flight.

The process can also address much more complex scenarios. For example, assume that the pilot of the Boston to San Francisco flight was directed to speed up to connect the Hong Kong passengers without regard to San Francisco's ability to handle the earlier arrival of the Boston flight. Arbitrarily adding increased demand for San Francisco's runways (the common asset) at a certain point in time has the consequence of moving back other aircraft also flying into San Francisco. Also consider that another aircraft, owned by the same airline, flying from Dallas to San Francisco was subsequently delayed by the early arrival of the Boston flight. The. Dallas flight had twenty passengers connecting to Australia with a minimum connect time. Now because of actions of the crew on the Boston flight without regard to the system view, the passengers on the Dallas flight missed their connection to Australia. The bottom line—the airline loses.

On the other hand, the process of the present invention's tactical management system not only evaluates the Boston to San Francisco flight as described above, but it also evaluates the Dallas flight as well. By managing the arrival flow of the controlled assets and tracking the uncontrolled assets, it assures that both flights have access to the available resources as best as physically possible.

Example 2—As pilots, mechanics and agents take independent actions to enhance their controlled assets, they often create interference and additional cost for their airline. A maintenance foreman may direct mechanics to learn the process of fixing an aircraft braking system rather than assign a mechanic who has fixed that particular braking system numerous times in the past.

To avoid the cost of having system specialists standing by to fix a problem as rapidly as possible, an aircraft may be delayed an extra forty-five minutes while the less experienced mechanic assures that the job is done safely. Unbeknownst to the foreman, his action caused cancellations of two down-line flights costing the airline thousands of dollars. His action was taken to avoid additional cost of a few hundred dollars, but unfortunately ends up costing the airlines many thousands of dollars.

Example 3—Flight 35 is scheduled to arrive at the gate in Chicago at 0830 and depart at 0905, with a minimum ground time. Unfortunately, Flight 35 is delayed into Chicago and will not arrive until 0850, twenty minutes late. The process of the present invention allows an airline to evaluate the trajectories of all Chicago bound aircraft (as well as the trajectories of the airline's other assets, passengers and cargo) for possible modifications. For example, it can identify that, because of fuel concerns, Flight 35 cannot speed up to arrive any earlier. It can also calculate that Flight 50 (schedule to arrive at the gate in Chicago at 0845 and depart at 0930) can increase speed and arrive at 0835 (ten minutes early). Next, it determines that the future trajectories of these two aircraft are such that the two aircraft can be swapped, so that the inbound Flight 50 aircraft is used as the outbound Flight 35 and the inbound Flights 35 aircraft is used as outbound flights 50. To assure that both flights depart on time, the process can calculates all required times based on the best tactical (latest) information. The trajectories of the ground personnel and assets can also be evaluated to assure that they are able to meet the needs of both aircraft (as well as all of the other aircraft). The process of the present invention can send a message to inbound Flight 50 to arrive at the arrival cornerpost (or ATC merge point) at 0810 so as to arrive at the gate at 0835. Next a message can be sent to inbound Flight 35 to arrive at the arrival cornerpost at 0830 so as to arrive at 0855. This allows inbound Flight 35 to slow down to conserve fuel, while still assuring enough gate time to meet all its needs to depart as Flight 50 on time at 0930. Additionally, the process makes it able for the ground support personnel to be notified of the change as well as alerting them that, for example, the passenger loads on inbound Flights 50 and outbound Flight 35 are low enough to assure Flight 35 can depart on time at 0910, shaving five minutes off the minimum gate time because of the real time demands of the two flights. Notification of the change and actual arrival times limit the chances of any delays in ground servicing.

Example 4—Flight 72 from LaGuardia to Washington National is canceled. The next flight, Flight 75 is scheduled for an aircraft that is too small to carry the combined loads of the two flights. The process of the present invention, through evaluation of the current and future trajectories of all of the airline's assets (especially the aircraft), determines that a larger aircraft can be substituted for the smaller aircraft. To do this, numerous factors must be evaluated, including: the future trajectories of both aircraft, the capacities (seats and cargo space) available, the trajectories of the scheduled passengers and cargo, maintenance requirements of both aircraft and when they can be swapped back to complete their scheduled activities.

Example 5—Numerous airline delays are caused by the unavailability of an arrival gate. Current airline management techniques typically assign gates on a strategic basis and only make modifications after a problem develops. The process of the present invention, through its ability to evaluate and mesh the current and future trajectories of the airline's assets, can assign arrival gates tactically. By assigning the arrival gates based on actual gate needs (at one to n hours prior to arrival), more aircraft can be accommodated.

Example 6—Given the increased predictability of the aircraft arrival time, the process of the present invention can sequence the ground support assets to better meet the needs and or wants of the aircraft. For example, it is customary to load the catering truck with more than one flight's food and beverage carts. By better knowing the gate arrival time of the aircraft one to two hours prior to arrival, the catering truck can be loaded with the correct catering carts in the correct order. This reduces the time necessary to offload the catering carts at each aircraft, better assures that the catering is delivered to the correct aircraft at the correct time so as to not delay the next departure.

Example 7—Hub operations typically require a large number of actions to be accomplished by an airline in a very short period of time. One such group of events is hub landings and takeoffs. Typically in tightly grouped hub operation, the departures of the user airline from the last hub operations compete for runway assets (a common asset) with the arrivals of the same user airline for the next hub operation. It is one embodiment of the present invention to coordinate landing times with takeoff times for the controlled aircraft, thus allowing the user airline to minimize delays for access to the available runway for both takeoffs and landings or allow delays to accrue to the aircraft that can best tolerate delays. One example of the method of the present invention might be to speed up some or all controlled aircraft arrivals (move up the production of arrivals which would increase fuel usage) to reduce runway arrival demand during the period when the runway is needed for departures. Another example might be moving up some or all of the departures, although it is recognized that moving any departure forward in time is more difficult given the fixed departure time associated with each flight. In either case, the arrival or departure aircraft that have their trajectories altered, forward or later in time, would be coordinated from a system perspective. For example, if a set of departure aircraft needed to be moved forward, the present invention might sequence the departure aircraft based on those that are already late for some other reason, or those that have little to no ability to speed up enroute.

Those skilled in the art of data processing understand that the present invention may be embodied in a software and hardware system that performs as depicted in FIG. 6a–6d flowcharts and diagrams found in FIGS. 7 through 10.

For example, one embodiment of the present invention takes the form of a system for managing the assets of a user airline and which is based upon consideration of data regarding the status and needs of the user airline assets and passengers, the assets of competitor airlines, common shared assets, aircraft positions and weather in order to achieve the user airline's specified business goals. Such a system comprises: (a) a computer processor means, (b) a storage means for storing data on a storage medium, (c) a first means for initializing the storage medium, (d) a second means for processing the considered data to predict the trajectories of the user airline assets, along with a smaller set of their competitor's assets (e.g., aircraft), and the loads that these trajectories will place upon the assets of the user airline and the shared assets, (e) a third means for processing the considered data, predicted trajectories and loads to determine the capability of the user airline to meet these loads and needs while achieving user airline specified, business goals, (f) a fourth means for processing the considered data to create alternative, potential scenarios, these scenarios arising as a result of specifiable changes in the predicted trajectories of the user airline assets, wherein these scenarios include calculations for the changes in the loads caused by the changed trajectories, and (g) a fifth means for processing and evaluating these alternative, potential scenarios to identify those scenarios which satisfy the asset loads, needs and specified business goals to a predetermined level.

There exist many means for performing the above enumerated functions. For example, all of the first—fifth, cited processing means can be achieved with the use of arithmetic logic circuits configured to retrieve the necessary stored data and operate of such data to compute the desired outputs. Additionally, a computer software program ("Attila 2000," ATH Group, Lanham, Md.) has been written to enable this system to operate on a personal computer having only standard data processing and storage capabilities.

Numerous technologies meet the individual data input requirements of the present invention. The specific technologies described herein (e.g., PASSUR, ASD, ACARS, etc.) are not meant to limit the scope of this patent, but are discussed to better describe, and help the reader to better understand the present invention. While it is envisioned that computer technologies represent the baseline application by most airlines, the application of the process of the present invention may be accomplished manually (albeit, much less efficiently). Additionally, in the future, newer technologies and more accurate data sources may provide better solutions to improve the individual steps in the process, thus improving the overall invention.

While it is recognized that the movement of aircraft represent the core airline process as described herein, the tactical management of all of the airline assets is important to determining the most profitable solution, for each given scenario. The description of the management of the aircraft asset herein is also not meant to limit the scope of the patent. For example, the present invention will just as easily manage passengers as work-in-process assets, or food trucks, or pilots, etc., all of these, and other of the user airline's assets must be tactically managed to operate the airline system in the most profitable manner.

The foregoing description of the invention has been presented for purposes of illustration and description. Further, the description is not intended to limit the invention to the form disclosed herein. Consequently, variations and modifications commensurate with the above teachings, and combined with the skill or knowledge in the relevant art are within the scope of the present invention.

The preferred embodiments described herein are further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the current art.

We claim:

1. A system for managing the assets of a user airline, based upon consideration of data regarding the status and needs of the user airline assets and passengers, the assets of other airlines, common shared assets and the weather, to achieve specified business goals of the user airline, said system comprising:

a computer processor means for processing data, a storage means for storing data on a storage medium, a first means for initialing the storage medium, a second means for processing said considered data to predict trajectories of a specified set of the user airline and other airline assets and the loads that said trajectories will place upon the assets of the user airline and the common assets, a third means for processing said considered data, predicted trajectories and loads to determine the capability of the user airline and the common assets to meet said loads and needs while achieving user airline specified, business goals, a fourth means for processing said considered data to create alternative, potential scenarios, said scenarios arising as a result of specifiable changes in the predicted trajectories of the user airline assets, wherein said scenarios include calculations for the changes in the loads caused by said changed trajectories, and a fifth means for processing and evaluating said alternative, potential scenarios to identify those scenarios which satisfy said asset loads, needs and specified business goals to a predetermined level.

2. A system as recited in claim 1, further comprising:

a sixth means for communicating said identified scenarios to user airline assets so that said trajectory changes may be implemented.

3. A system as recited in claim 1, further comprising:

a means for monitoring a temporally varying status of said specified assets and the weather so as to identify when said status changes cause reductions, in a degree of satisfaction of said predicted loads, needs and specified business goals for said currently implemented trajectories, which result in said predetermined level no longer being satisfied, an eighth means for, upon occurrence of status changes resulting in non-satisfaction of predetermined level, causing said processor means to resume creation and identification of alternative, potential scenarios which can again yield satisfaction of said asset loads, needs and specified business goals to said predetermined level.

4. A system as recited in claim 2, further comprising:

a seventh means for monitoring a temporally varying status of said specified assets and the weather so as to identify when said status changes cause reductions, in a degree of satisfaction of said predicted loads, needs and specified business goals for said currently implemented trajectories, which result in said predetermined level no longer being satisfied, an eighth means for, upon occurrence of status changes resulting in non-satisfaction of predetermined level, causing said processor means to resume creation and identification of alternative, potential scenarios which can again yield satisfaction of said asset loads, needs and specified business goals to said predetermined level.

5. A system as recited in claim 1, wherein said first means comprising:

a means for inputting and storing on the storage medium data, for specified aircraft of the said user airline, regarding: aircraft safety, passenger and cargo servicing, aircraft servicing, aircraft movement and support services.

6. A system as recited in claim 2, wherein said first means comprising:

a means for inputting and storing on the storage medium data, for specified aircraft of the said user airline, regarding: aircraft safety, passenger and cargo servicing, aircraft servicing, aircraft movement and support services.

7. A system as recited in claim 4, wherein said first means comprising:
- a means for inputting and storing on the storage medium data, for specified aircraft of the said user airline, regarding: aircraft safety, passenger and cargo servicing, aircraft servicing, aircraft movement and support services.

8. A system as recited in claim 1, wherein said specified set of the user airline and other airline assets comprising specified elements chosen from the group consisting of the aircraft, personnel and ground vehicles of the user airline and the aircraft of other airlines.

9. A system as recited in claim 2, wherein said specified set of the user airline and other airline assets comprising specified elements chosen from the group consisting of the aircraft, personnel and ground vehicles of the user airline and the aircraft of other airlines.

10. A system as recited in claim 4, wherein said specified set of the user airline and other airline assets comprising specified elements chosen from the group consisting of the aircraft, personnel and ground vehicles of the user airline and the aircraft of other airlines.

11. A computer implemented method of managing the assets of a user airline, based upon consideration of data regarding the status and needs of the user airline assets and passengers, the assets of other airlines, common shared assets and the weather, to achieve specified business goals of the user airline, said method comprising utilizing said computer to perform the steps of:
- collecting and storing said considered data,
- processing said considered data to predict trajectories of a specified set of the user airline and other airline assets and the loads that said trajectories will place upon the assets of the user airline and the common assets,
- processing said considered data, predicted trajectories and loads to determine the capability of the user airline to meet said loads and needs while achieving user airline specified, business goals,
- processing said considered data to create alternative, potential scenarios, said scenarios arising as a result of specifiable changes in the predicted trajectories of the user airline assets, wherein said scenarios include calculations for the changes in the loads caused by said changed trajectories,
- processing and evaluating said alternative, potential scenarios to identify those scenarios which satisfy said asset loads, needs and specified business goals to a predetermined level, and
- communicating said identified scenarios to user airline assets so that said trajectory changes may be implemented.

12. A method as recited in claim 11, further comprising the steps of:
- monitoring the temporally varying status of said specified assets and the weather so as to identify when said status changes cause reductions, in the degree of satisfaction of said predicted loads, needs and specified business goals for said currently implemented trajectories, which result in said predetermined level no longer being satisfied, and
- upon occurrence of status changes resulting in non-satisfaction of predetermined level, resuming creation and identification of alternative, potential scenarios which can again yield satisfaction of said asset loads, needs and specified business goals to said predetermined level.

13. A method as recited in claim 11, wherein said specified set of the user airline and other airline assets comprising specified elements chosen from the group consisting of the aircraft, personnel and ground vehicles of the user airline and the aircraft of other airlines.

14. A method as recited in claim 12, wherein said specified set of the user airline and other airline assets comprising specified elements chosen from the group consisting of the aircraft, personnel and ground vehicles of the user airline and the aircraft of other airlines.

15. A method as recited in claim 11, wherein said data regarding the status and needs of the user airline assets and passengers includes data, for specified aircraft of the said user airline, relevant to: aircraft safety, passenger and cargo servicing, aircraft servicing, aircraft movement and support services.

16. A method as recited in claim 12, wherein said data regarding the status and needs of the user airline assets and passengers includes data, for specified aircraft of the said user airline, relevant to: aircraft safety, passenger and cargo servicing, aircraft servicing, aircraft movement and support services.

\* \* \* \* \*